US009274790B2

(12) United States Patent
Marimuthu et al.

(10) Patent No.: US 9,274,790 B2
(45) Date of Patent: Mar. 1, 2016

(54) CUSTOMIZATION MANAGER

(71) Applicant: ORACLE INTERNATIONAL CORPORATION, Redwood Shores, CA (US)

(72) Inventors: Prabhakaran Marimuthu, Chennai (IN); Tony P. Thomas, Changanacherry (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/266,460

(22) Filed: Apr. 30, 2014

(65) Prior Publication Data

US 2015/0317154 A1 Nov. 5, 2015

(51) Int. Cl.
G06F 9/44 (2006.01)

(52) U.S. Cl.
CPC .......................................... *G06F 8/71* (2013.01)

(58) Field of Classification Search
None
See application file for complete search history.

(56) References Cited

U.S. PATENT DOCUMENTS

| | | | |
|---|---|---|---|
| 4,912,637 A * | 3/1990 | Sheedy et al. | |
| 5,581,755 A * | 12/1996 | Koerber et al. | |
| 5,845,128 A * | 12/1998 | Noble et al. | 717/170 |
| 6,367,077 B1 * | 4/2002 | Brodersen et al. | 717/170 |
| 6,553,563 B2 * | 4/2003 | Ambrose et al. | 717/116 |
| 7,000,223 B1 * | 2/2006 | Knutson | G06T 11/60 |
| | | | 717/121 |
| 7,174,540 B2 * | 2/2007 | Ondrusek | G06F 8/71 |
| | | | 717/121 |
| 7,185,343 B1 * | 2/2007 | Quast | G06F 8/30 |
| | | | 717/120 |
| 7,225,426 B2 * | 5/2007 | Frank | G06F 8/34 |
| | | | 717/121 |
| 7,333,907 B2 * | 2/2008 | Delenstarr | G06F 19/20 |
| | | | 717/122 |
| 7,546,314 B1 * | 6/2009 | Lakner | G06F 8/67 |
| | | | 717/122 |
| 7,644,392 B2 * | 1/2010 | Geipel | G06F 8/71 |
| | | | 717/121 |
| 7,752,637 B2 | 7/2010 | Gunduc et al. | |
| 8,122,377 B2 | 2/2012 | Jindal et al. | |
| 8,196,132 B2 * | 6/2012 | Ergo | G06F 3/011 |
| | | | 717/121 |
| 8,209,675 B2 | 6/2012 | Zhao et al. | |
| 8,296,733 B2 * | 10/2012 | Phillips | G05B 19/056 |
| | | | 717/122 |
| 8,387,010 B2 * | 2/2013 | Hashimoto | G06F 8/36 |
| | | | 717/120 |
| 8,397,209 B2 * | 3/2013 | Kirby, Jr. | G06F 8/10 |
| | | | 717/120 |
| 8,418,131 B2 * | 4/2013 | Emmelmann | G06F 8/315 |
| | | | 717/122 |

(Continued)

OTHER PUBLICATIONS

Eibl, The KDiff3 Handbook; 2001, published on line; <retrieved on Apr. 30, 2015> Retrieved from the Internet <URL: https://docs.kde.org/development/en/extragear-utils/kdiff3/kdiff3.pdf>; pp. 1-45.*

(Continued)

Primary Examiner — Xi D Chen
(74) Attorney, Agent, or Firm — Omkar K. Suryadevara; Silicon Valley Patent Group LLP

(57) ABSTRACT

A customization includes a name of a module of source code in an existing generic version of application software, a specific position within the module, and a name of a file which contains additional software. An existing customized version of the application software is then prepared, to execute the additional software in executing the existing generic version at the existing specific position. When a new generic version of the application software is received, the existing customization is displayed if applicable to a module in the new generic version, followed optionally by receipt of an update to the existing specific position. On indication of user approval, a new customized version of the application software is prepared, to execute the additional software in executing the module in the new generic version, at the existing specific position or at an updated specific position, which depends on the optional receipt of the update.

18 Claims, 15 Drawing Sheets

(56) References Cited

U.S. PATENT DOCUMENTS

| | | | | |
|---|---|---|---|---|
| 8,578,359 | B2* | 11/2013 | Meller | G06F 8/665 |
| | | | | 717/122 |
| 8,635,597 | B2* | 1/2014 | Drebinger | G05B 19/054 |
| | | | | 717/120 |
| 8,689,184 | B2* | 4/2014 | Storer | G06F 8/20 |
| | | | | 717/120 |
| 2007/0067338 | A1 | 3/2007 | Koizumi et al. | |
| 2008/0134136 | A1 | 6/2008 | Petersen | |
| 2013/0036400 | A1* | 2/2013 | Bak et al. | 717/101 |

OTHER PUBLICATIONS

MacKenzie, et al., Comparing and Merging Files>; 1993, Software Foundation, Inc.; <retrieved on Apr. 30, 2015> Retrieved from the Internet <URL: https://docs.freebsd.org/info/diff/diff.pdf>; pp. 1-70.*

Hayashi, Saeki, "Ecording Finer-Grained Software Evolution with IDE: An Annotation-Based Approach"; 2010 ACM; [retrievedon Oct. 20, 2015]; Retrieved from Internet <URL:http://dl.acm.org/citation.cfm?id=1862372.1862378>; pp. 8-12.*

Cheng, et al., "Weaving a Social Fabric into Existing Software"; 2005, ACM;[retrievedon Oct. 20, 2015]; Retrieved from Internet <URL:http://dl.acm.org/citation.cfm?id=1052898.1052911>; pp. 147-158.*

Jalili, et al., "AECM: an Aspect Enabled Component Model", 2005 IEEE; [retrievedon Oct. 20, 2015]; Retrieved from Internet <URL:http://ieeexplore.ieee.org/stamp/stamp.jsp?tp=&arnumber=1607216>; pp. 1-6.*

Rasche, Schult, "Dynamic Updates of Graphical Component"; 2007, Conference of Communication in Distributed System; [retrieved on Oct. 20, 2015]; Retrieved from Internet <http://ieeexplore.ieee.org/stamp/stamp.jsp?tp=&arnumber=5755496>; pp. 1-12.*

Customization—salesforce.com, http://www.salesforce.com/platform/customization/ Nov. 27, 2013.

NetSuite Business Management Cloud-Based Accounting, CRM, ERP & Financials http://www.bmicloud.com/solutions/netsuite-cloud-based-accounting-crm-and-erp . . . Nov. 29, 2013.

Supplier Relationship Management (SAP SRM) Extensibility http://scn.sap.com/community/srm/blog/2013/11/06/extensibility-in-sap-srm-user-interface-addon-10 Nov. 27, 2013.

ERP 2.50:Developers Guide/How to Create and Package a Module http://wiki.openbravo.com/wiki/ERP_2.50:Developers_Guide/How_To_Create_and_Package_a_Module#Objective Dec. 2, 2013.

RPC supports ERP Channel Partners with Eclipse http://www.eclipse.org/community/casestudies/rpc.pdf Belived to be prior to Dec. 3, 2013.

ERP Software http://www.tuppas.com/erp-software/erp-software.htm Nov. 27, 2013.

Use a Pace—Layered Application Strategy to Clean Up ERP During Upgrades and Consolidation http://www.pega.com/sites/default/files/docs/resources Feb. 8, 2012.

Application enhancement tool http://help.sap.com/downloads/pdf/saphelp_crm70_en_01_320bd270e84f419953906fe8050ed1_frameset.pdf Nov. 27, 2013.

* cited by examiner

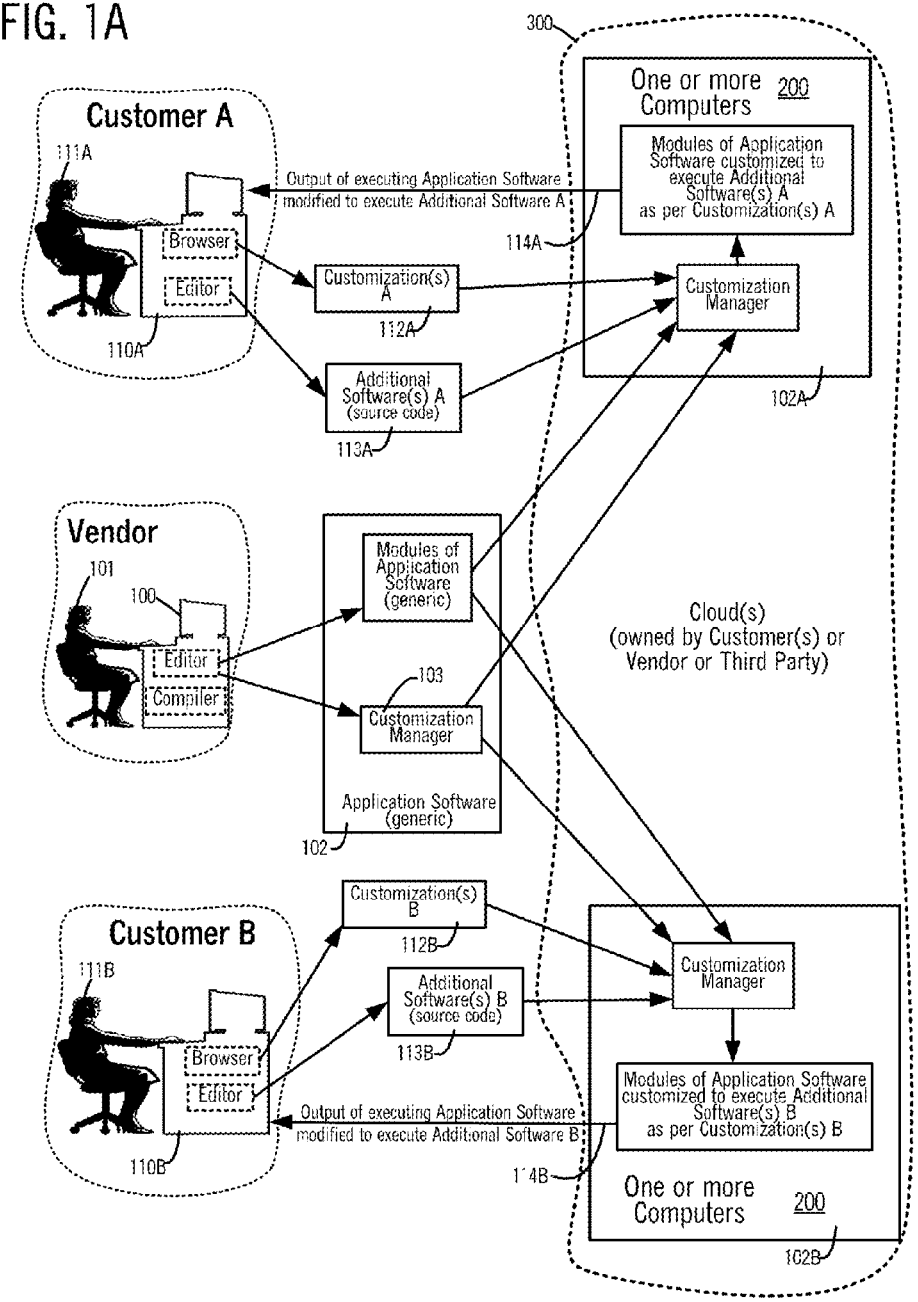

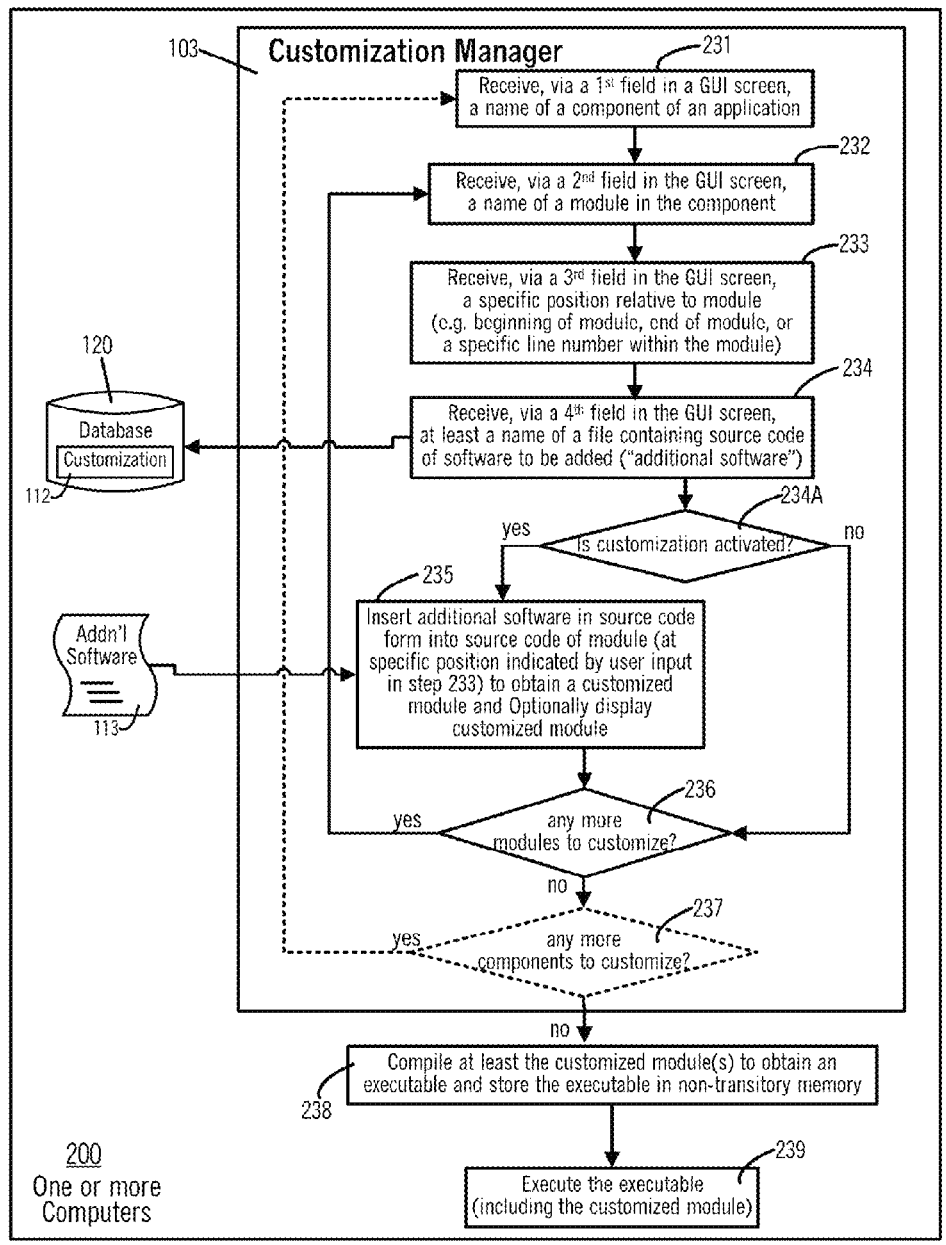

```
Preview Customized Module (EMPLOYEE_PROFILE, RowInit)
02  If &sExists <> "X" Then
03     SQLExec ("select max(subitemnum) from pspnlgroup where pnlgrpname = :1", EOCI
       /* *** Custom code inserted by Customization Manager starts here *** */
       Local string &sPkgRoot, &sPkgClass;
       SQLExec("select packageroot, appclass_path from ps_eoci_cust_event, ps_cust where
       If All (&sPkgRoot) And
          All (&sPkgClass) Then
             &obj_str = &sPkgRoot | "." | &sPkgClass;
             &obj = CreateObject(&obj_str);
       End-If;
       /* *** Custom Code inserted by Customization Manager ends here *** */
04     WinMessage (&nSubItem, 0);
05     &recPnlGrp = CreateRecord(Record.PSPNLGROUP);
06     &recPnlGrp.PNLGRPNAME.Value = EOCI_CUST_PNLGRP.PNLGRPNAME.Value;
07
08  If &sExists <> "Z" Then
09     SQLExec ("select max(subitemname) from nlgroup where nlgrpname = :1", FCI
10     WinMessage (&nSubItem, 0);
```

FIG. 3F

CUSTOMIZATION MANAGER

FIELD

This patent application relates to apparatuses, methods and non-transitory computer-readable storage media that customize original software delivered by a vendor to a customer, and then execute modified software which is obtained by customization.

BACKGROUND

Most software delivered by a software vendor typically meets the needs of a customer. Some customers have their own requirements, which are unique to their business. Hence, software delivered by a vendor may be customized, to fit a customer's specific needs. However, customization of a vendor's software acts as a barrier to upgrading, applying patches or maintaining software by the vendor. This is because a bug fix or patch provided by the vendor is typically based on an initial version which the vendor supplied to the customer, not accounting for any customization of the vendor-supplied software at a customer's premises. If a customer applies a patch or fix from the vendor, one or more customizations of the initial version which are made by the customer may get overwritten by a new version from the vendor. This makes applying patches or fixes or even upgrading to a latest version difficult for customers.

When customized software is to be upgraded by a fix supplied by a vendor, manual effort is required at the customer's premises, to maintain previously applied customization(s). Specifically, during the upgrade process, a customer needs to manually review and identify all vendor-supplied modules where any customization has been applied. Then, the customer has to make a copy of any custom code they added to the vendor-supplied modules, and then apply the fix or patch delivered by the vendor. After the fix or patch is applied, the customer must use the custom code copy to re-apply their customizations to new versions of the vendor-supplied modules.

Due to the time and cost involved in the upgrade process, many customers refrain from upgrading an initial version of vendor-supplied modules, by not applying patches, fixes, maintenance packages, upgrade codes etc. This traps the customer into staying with an old version of the vendor-supplied software, losing benefits of new features and enhancements, even though a latest and powerful version is available in the market. The inventors of the current patent application believe that there is a need for apparatuses, methods and non-transitory computer-readable storage media of the type described below, to improve the process of applying customizations to vendor-supplied software, as described below.

SUMMARY

In several described embodiments, one or more computers store in a database, a customization which indicates how application software is to be customized. Specifically, the customization includes a name of a module of source code in a generic version of application software, a specific position within the module, and a name of a file which contains additional software. Depending on the embodiment, such a customization may additionally include other information, such as a name of a component of the application software to which the module being customized belongs, and one or more geographic locale(s) in which the customization is applicable. The customization may be received in the form of input from a human user, via fields in one or more screens of a graphical user interface (GUI).

In many of the described embodiments, one or more computers additionally receive application software from a vendor in a form (also called "generic version") that is commonly supplied to several customers. After receipt of a generic version of the application software, the one or more computers apply one or more customization(s) of the type described in the previous paragraph above, specifically by preparing and storing in one or more non-transitory computer-readable storage media, a customized version of the application software. The customized version of the application software executes the above-described additional software (at the specific position identified in the customization), whenever the generic version of the application software is executed.

A customized version of the application software may be prepared by insertion of the additional software directly into the application software, or by insertion of a function call that invokes execution of the additional software, depending on the embodiment. The additional software(s) identified by customization(s) and the application software may both be in the form of source code in some embodiments, in which case the customized version of the application software is compiled, to obtain one or more executable(s), which are then executed in the normal manner thereby executing the existing customized version. In other embodiments, the additional software(s) and the application software may both be in the form of object code, in which case no compilation is needed after customization, to execute a customized application software.

The above-described customization(s) are stored in a database in non-transitory computer-readable storage media, after one generic version of the application software ("existing generic application software") has been customized, for future use when a new generic version of the application software is received. Hence, customizations that were previously applied to prepare an existing customized version of the application software are retrieved from the database after receipt of a new version of the generic application software. Depending on the embodiment, a customer's computer(s) may issue a database query (e.g. in SQL) based on module names in a new generic version of application software being identical to corresponding module names in previously-applied customizations (which include module names of the existing generic version). The retrieved customizations are identified in a screen prepared for display to a human user, followed optionally by updating the customizations based on user input. Then, the retrieved customizations which are approved by user input (with or without update) are applied to the new generic version of application software, e.g. by inserting additional source code(s) (directly or indirectly via a function call) into the module(s) of the new generic version, to obtain a new customized version that executes the additional software when executing the new generic version. In embodiments wherein the new customized version is in source code form, it is then compiled to obtain new executable(s), followed by executing the new executable(s) in the normal manner.

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIGS. 1A and 1B show, in data flow diagrams, a computer of a vendor that transmits generic application software to one or more computers in a cloud, and computer(s) of customer(s) transmitting to the cloud computer(s), customization(s) indicative of when additional software is to be executed in executing the generic application software, in some illustrative embodiments.

FIG. 2 illustrates, in a flow chart, acts performed by one or more computers 200 by use of one or more processors programmed with a sequence of instructions of software stored in one or more memories, to implement a customization manager, in exemplary embodiments in accordance with the invention.

FIGS. 3A-3G illustrate screens generated by one or more computers 200 in performing acts of the type illustrated in FIG. 2.

DETAILED DESCRIPTION

In accordance with the invention, an employee 101 (FIG. 1A) of a software vendor (e.g. Oracle Corporation or SAP AG) prepares in a computer 100, certain software "application software") 102 for use by employees of multiple customers, e.g. employees 111A and 111B of respective customers A and B. Application software 102 is "generic" and designed for use by any number of multiple customers (although only two customers are shown in FIG. 1A for illustration). Application software 102 (FIG. 1A) includes logic to perform one or more business functions in an organization, such as logic used by each customer to perform Enterprise Resource Planning ("ERP"), e.g. software to manage each customer's own customers called "Customer Relationship Management (CRM)", software to manage each customer's own suppliers, called "Supply Chain Management (SCM)" etc.

Figure 1B:
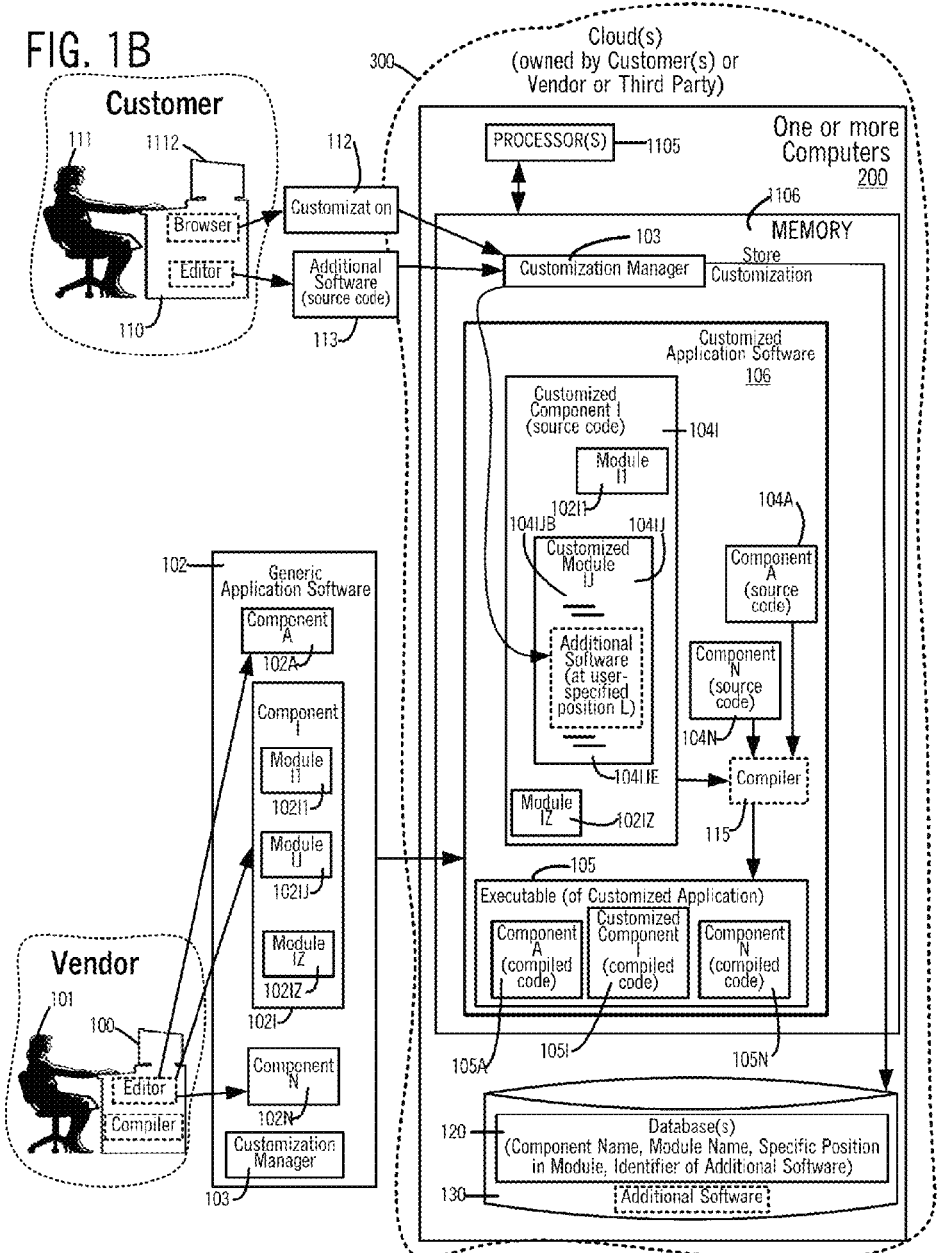

As shown in FIG. 1A, software vendor's computer 100 transmits application software 102 to one or more computers (also called "server" computers) 200 that may implement a "cloud" 300. In cloud 300, one or more computers 200 may be owned and managed by various entities, e.g. by customer(s), and/or by the vendor, and/or by a third party, depending on the embodiment. In some embodiments, vendor's computer 100 additionally transmits to cloud or server computer(s) 200, software 103 which is to be used in customizing application software 102, hereinafter "customization manager." In some embodiments, customization manager 103 is transmitted by vendor's computer 100 to cloud computer(s) 200 separate from and independent of transmission of application software 102 as shown in FIG. 1A, although in certain embodiments customization manager 103 is an integral portion of application software 102 and transmitted together as shown in FIG. 1B. In the just-described certain embodiments shown in FIG. 1B, customization manager 103 being an integral portion of application software 102 makes upgrade of application software 102 easy, e.g. by eliminating the need for employee 111 to invoke customization manager 103, and eliminating the need to login to customization manager 103, etc. In the just-described certain embodiments shown in FIG. 1B, screens of customization manager 103 are formatted with look and feel similar or identical to screens of application software 102 to provide a seamless experience to employee 111, when customizing and upgrading application software 102.

The one or more cloud or server computers 200 additionally receive, from computer(s) 110A and 110B of the respective customers A and B, additional software(s) 113A and 113B which are to be executed when executing the generic version of the application software at specific positions thereof as identified by respective customizations 112A and 112B. Customization manager 103 (FIG. 1A), when executed by the cloud or server computer(s) 200, prepares a customized version of application software 102 by insertion of the additional software directly into the application software, or by insertion of a function call that invokes execution of the additional software, depending on the embodiment. For example, customized application software 102A (FIG. 1A) is created by insertion of additional software(s) 113A directly or via a function call into application software 102 at specific position(s) identified by customization 112A, while customized application software 102B (FIG. 1A) is created by insertion of additional software(s) 113B directly or via a function call into application software 102 at specific position(s) identified by customization 112B.

The customized application softwares 102A and 102B are thereafter used by employees 111A and 111B of respective customers A and B via local computers 110A and 110B in the normal manner, to receive and view display of information in the form of respective outputs 114A, 114B (FIG. 1A). Execution of additional software(s) 113A and 113B by cloud or server computer(s) 200 when executing the generic version of the application software generates different information as outputs 114A, 114B which may be displayed in a graphical user interface (via a browser) on the respective video display monitors of local computers 110A and 110B used by employees 111A and 111B. The specific manner in which application software 102 is customized by computer(s) 200, to generate the information displayed to one customer's employee 111 is described next, in reference to FIG. 1B.

Application software 102 (FIG. 1B) which is supplied generically by vendor's computer 100 to multiple customers includes multiple components A . . . I . . . N in the normal manner, and each component I include multiple modules, such as modules I1 . . . IJ . . . IZ. Application software 102 is not componentized in some embodiments, in which case application software 102 directly includes modules, without grouping into components. As noted above, customization manager 103 is used in computer(s) 200 to receive, store and use one or more customization(s) 112 (FIG. 1B) that customize one or more of components 102A . . . 102I . . . 102N. In some embodiments, customization manager 103 adds the additional software 113 (FIG. 1B) in source code form ("additional source code"), based on each customer's individual requirements.

Specifically, in several embodiments, an employee 111 of a customer prepares additional source code 113 (FIG. 1B) in their local computer 110, and supplies it to computer(s) 200 with a corresponding customization 112 that specifically identifies the additional source code 113 and further identifies a specific position at which it is to be executed in application software 102. In many embodiments, customization 112 is an n-tuple (e.g. a 3-tuple or a 4-tuple) that specifies when additional source code 113 is to be executed in computer(s) 200 in executing generic application software 102 received by computer(s) 200 from the vendor's computer 100.

As noted above, in several embodiments, each component I in an application software 122 (also called "generic application software") includes several modules, such as modules I1 . . . IJ . . . IZ. In such embodiments, a customization 112 uniquely identifies one specific module therein, e.g. module IJ. Depending on the embodiment, in order to uniquely identify a module IJ, customization 112 may further identify within generic application software 102 a specific component I in which module IJ is included. In addition, customization 112 of several embodiments identifies a specific position in the identified module IJ, at which the additional software 113 is to be executed. A specific position identified by user input received for customization 112 (either via a keyboard or via a mouse, as described elsewhere herein) may provide an indication, for example, (1) at a beginning of module IJ, e.g. beginning position 104IJB before the very first instruction in module IJ, or (2) at an end of module IJ, e.g. end position 104IJE after the very last instruction in module IJ, or (3) at a specific line number L within module IJ. The indication of line number L is after a beginning position 104IJB in module IJ (i.e. after line number 1) and before an ending position 104IJE in module IJ (i.e. before a total number T of lines of instructions in source code form in module IJ). Thus the line number L is an indication of a specific position after line number 1 of the first line in module IJ and before line number T of the last line of instructions in source code form in module IJ, i.e. 1<L<T.

Customization 112 of some embodiments may be implemented as a 3-tuple which includes: (1) a name of module IJ of source code in application software 102, (2) an indication of a specific position in the module IJ (e.g. line 7, or a beginning position 104IJB or end position 104IJE), and (3) a name of a file which contains additional software in source code form. In one illustrative example, a file which contains additional software in source code form ("additional source code") is named RowInitatLine7 and a 3-tuple form of customization 112 is (RowInit, Line 7, RowInitatLine7), wherein "RowInit" uniquely identifies a specific module in the application software 102.

As noted above, in some embodiments, customization 112 is implemented to include a name of a component I that includes module IJ. Hence, when implemented as a 3-tuple, such a customization 112 includes the module name and the component name in a single text string, with the two names being demarcated by a slash (or another such predetermined character) therebetween, thereby to form a single element of the 3-tuple. For example, if a module RowInit in the component EMPLOYEE_PROFILE is to be customized, a 3-tuple form of customization 112 is (EMPLOYEE_PROFILE/RowInit, Line 7, RowInitatLine7). Many embodiments implement customization 112 as a 4-tuple in which the module name is one element of the 4-tuple and the component name is another element of the 4-tuple, an example of which is: (EMPLOYEE_PROFILE, RowInit, Line 7, RowInitatLine7). In some embodiments, elements of a tuple that implement customization 112 may include not only the above-described name(s), but also paths, e.g. an element of such a tuple that includes a file name RowInitatLine7 to identify the additional source code may include therein a directory or folder, and a path thereto which is local or remote (e.g. URL), as apparent in view of this description.

In several embodiments, the "n" elements of a tuple in a customization 112 are received as user input by computer(s) 200 via corresponding "n" or more fields in a graphical user interface (GUI) screen. Such a GUI screen is implemented in some embodiments in the form of a web page prepared by customization manager 103 in computer(s) 200 and displayed to customer's employee 111 by a browser in computer 110. Hence, in an act 231 (FIG. 2), customization manager 103 of some embodiments receives, via a field in the GUI screen, a name of a component, e.g. component I. And, in an act 232, customization manager 103 receives, via another field in the GUI screen, a name of a module, e.g. module IJ in the component I (as noted above, component I was specified by user input received in act 231). In an act 233, customization manager 103 receives, via still another field in the GUI screen, an indication of a specific position in the module IJ, e.g. beginning position 104IJB, in-between position at line number L or end position 104IJE (as noted above, module IJ was specified by user input received in act 232). Moreover, in an act 234, customization manager 103 receives, via yet another field in the GUI screen, at least a name of a file containing the additional source code 113 (to be added to module IJ).

At the end of act 234, several embodiments of customization manager 103 stores in a database 120, the information received as user input in acts 231-234 as being associated with one another, namely as a customization 112 in database 120. Customization 112 is stored in a predetermined data structure in database 120, e.g. when database 120 is implemented as a hierarchical database in some embodiments, while in other embodiments customization 112 is stored in a row of a table in database 120, with one column for each element of the n-tuple in customization 112, e.g. when database 120 is implemented as a relational database which is accessible by executing software of a relational database management system (RDBMS), such as Oracle 11gR2 available from Oracle Corporation of Redwood Shores, Calif.

After act 234, in an act 234A, customization manager 103 checks if the customization 112 is activated by user input. Depending on the embodiment, customizations may be activated by user input, individually for a specific customization or in a group of multiple customizations. Group activation of customizations may be supported, for example, at a module level, or at a component level, depending on the embodiment. Certain embodiments support activation of customizations at a component level e.g. via user input in status field 311 shown in FIGS. 3A and 3C, as follows.

In one illustrative example, user input in a field 311 (FIG. 3A) indicates that customizations of a specific component, such as "EMPLOYEE_PROFILE" are inactive, in which case branch 234B is taken to act 236 (described below). As another example, user input in field 311 (FIG. 3C) may indicate that customizations of a specific component, such as "EMPLOYEE_PROFILE" are active, in which case branch the customization manager goes from act 234A to act 235 (described below). Selective activation or inactivation based on user input as just described enables a customer to easily and quickly respond to changes in requirements by the customer's business (e.g. a previously-applied customization may no longer be needed, or vice versa). More specifically, user input indicating a customization as inactive returns operation of application software to the original version 102 (i.e. a version transmitted by vendor's computer 100).

In act 235, customization manager 103 prepares a customized component 104I (which therefore results in a customized version of application software 106) in any manner appropriate, to execute the additional software (specified by user input received in act 234) when executing a new version of the module IJ (specified by user input received in act 232), at the specific position (specified by user input received in act 233). The manner in which a customized version of application software 106 (FIG. 1B) is prepared can be different, depending on the embodiment, as follows.

Figure 3A:
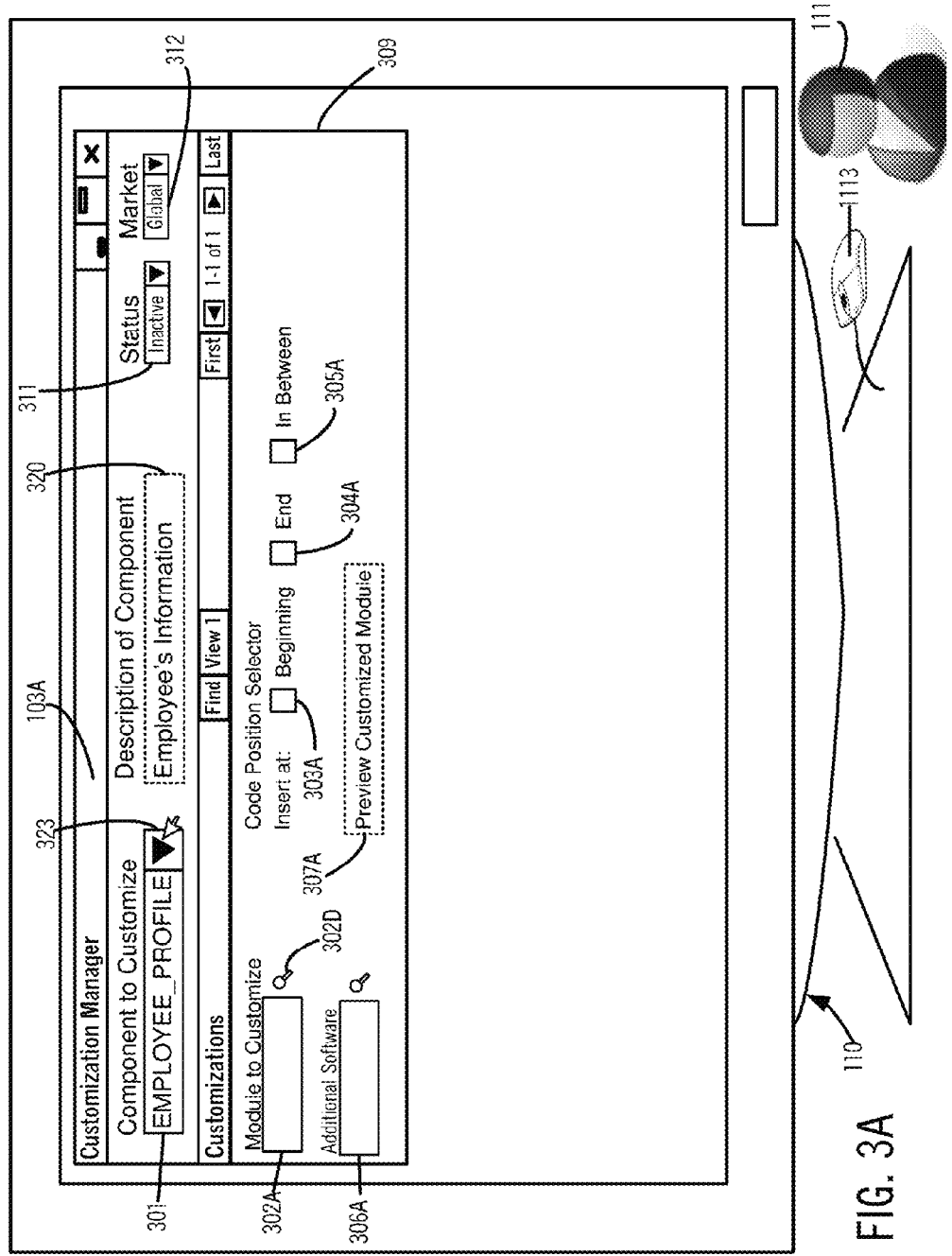
Figure 3B:
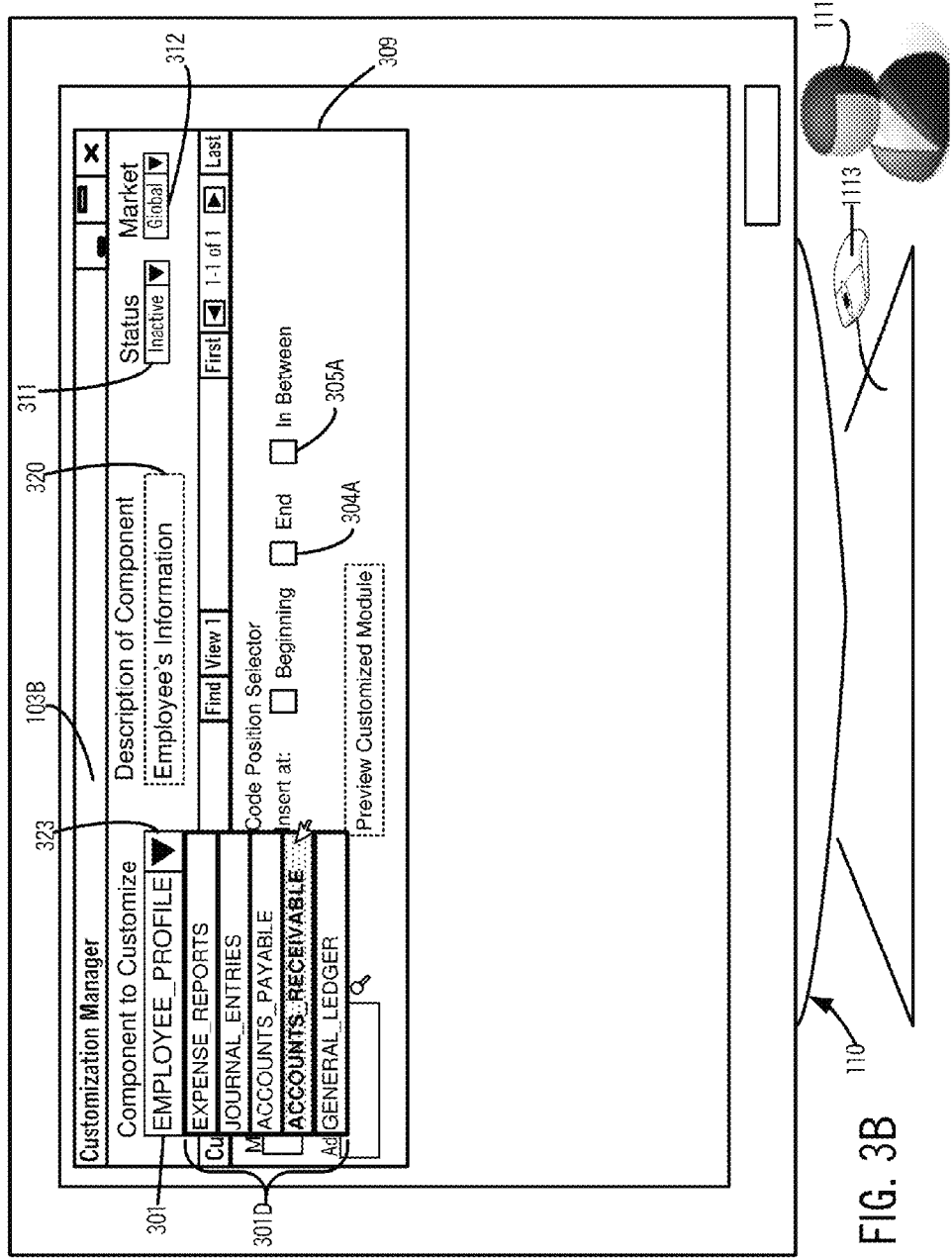
Figure 3C:
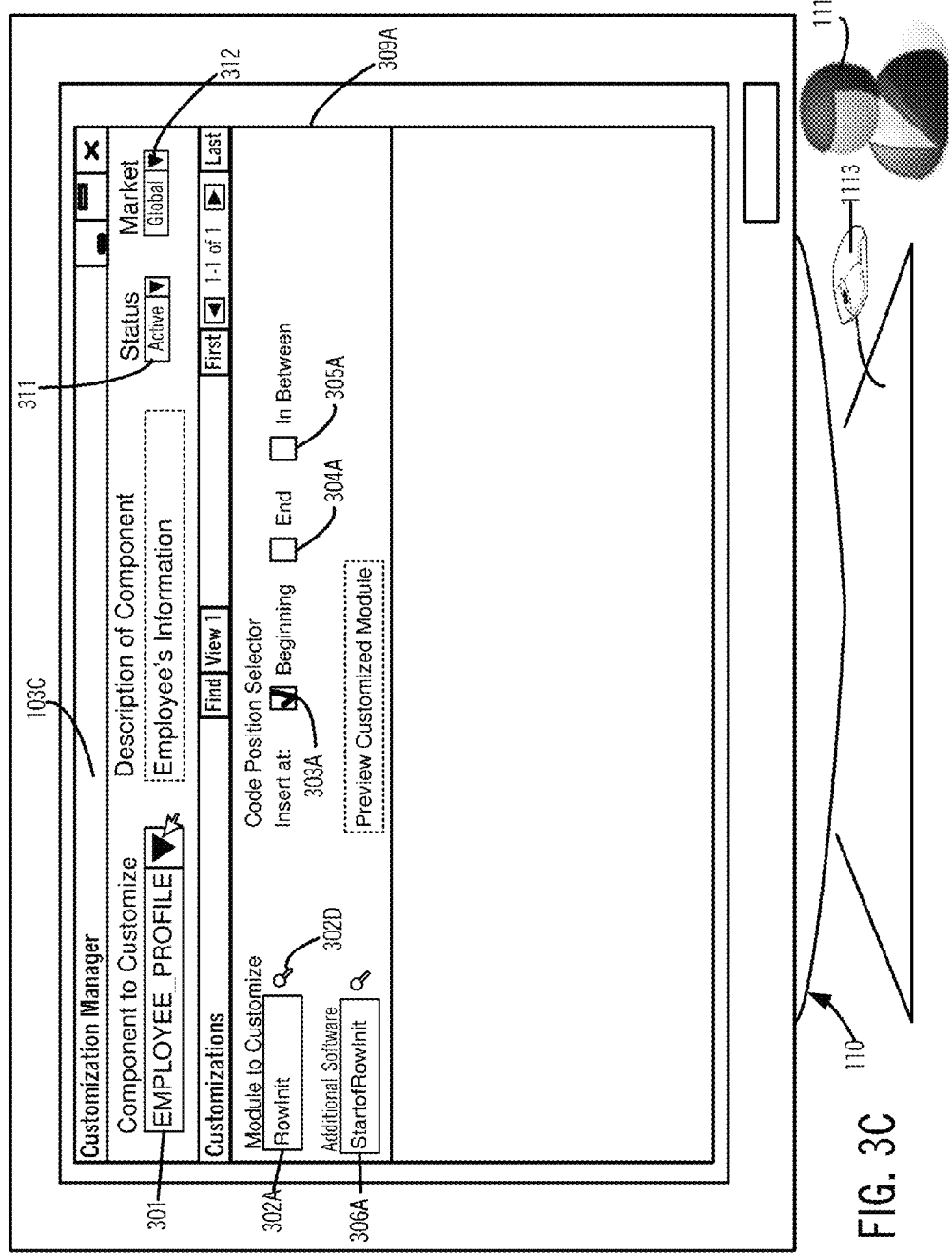
Figure 3D:
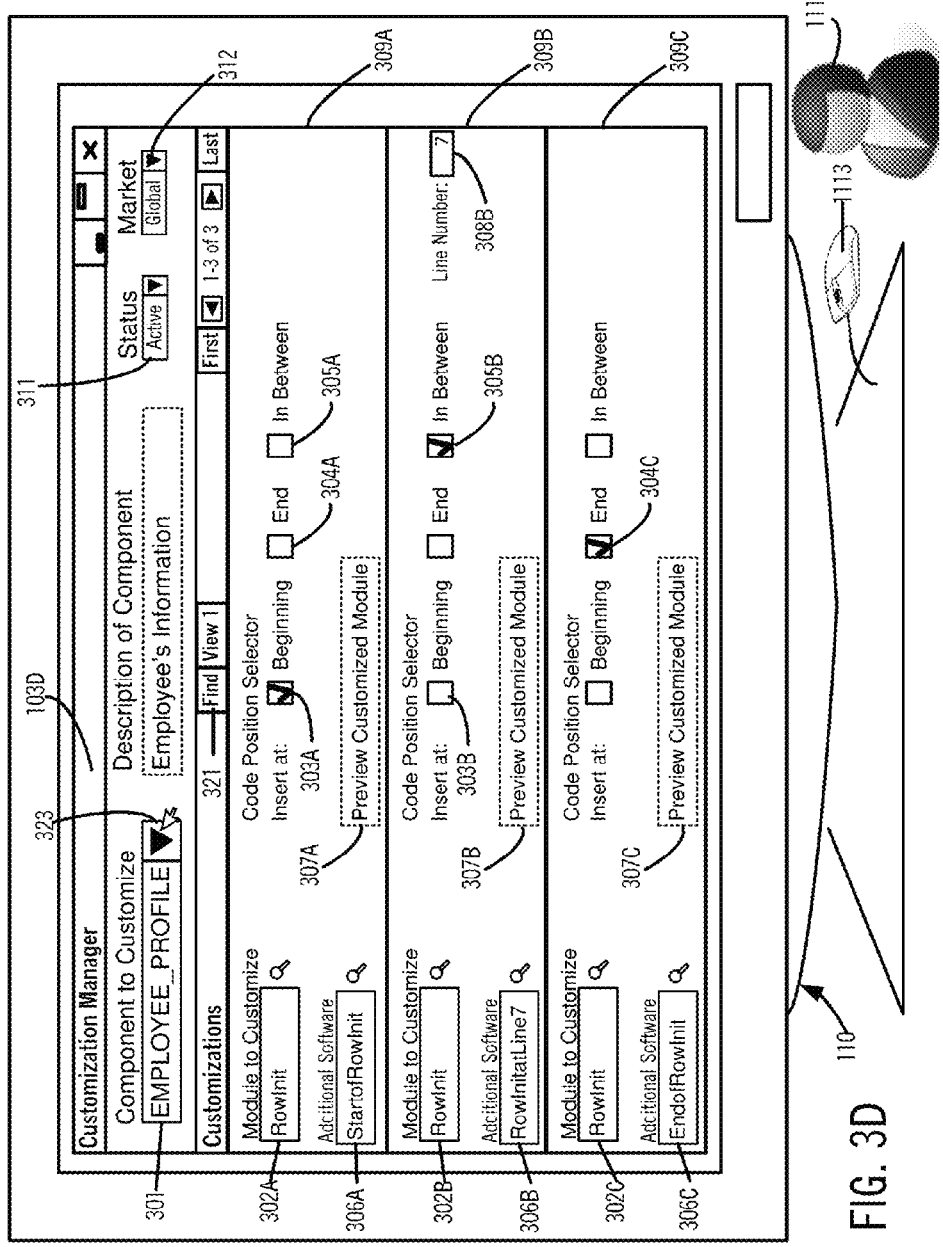
Figure 3E:
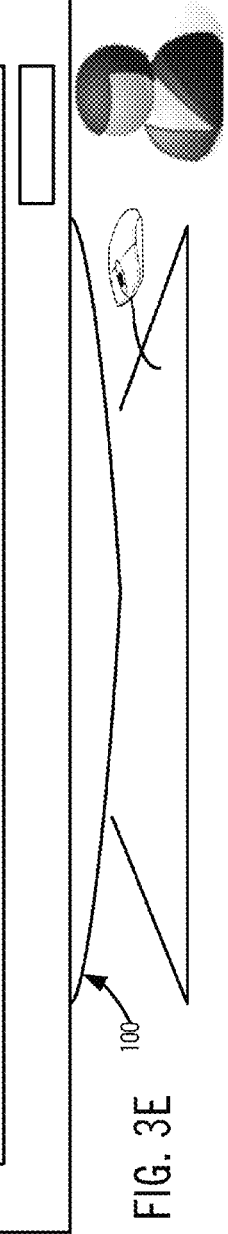

In several embodiments, customization manager 103 inserts additional software 113 directly in an in-line manner at the specific position in application software 102 (thereby to obtain customized version 106), e.g. as shown by additional software 113 which has been inserted in-line, between lines 7 and 8 of module 102IJ as shown in FIG. 3E. In certain other embodiments, customization manager 103 inserts a function call (not shown) at the specific position in application software 102 (thereby to obtain customized version 106), and it is the inserted function call that in turn invokes execution of additional software 113 when executing the new version of module IJ.

In some embodiments, additional software 113 is inserted into a new version of the module IJ (e.g. between lines 7 and 8 as shown in FIG. 3E), while in alternative embodiments additional software 113 may be inserted into a different module which may be selected based on always preceding or always following module IJ in situations wherein the specific position happens to be at the beginning or at the end of module IJ. In these alternative embodiments, insertion at the beginning of module IJ is equivalent to insertion at the very end of a preceding module IJ−1 (in situations wherein execution of module IJ always follows execution of preceding module IJ−1) and similarly insertion at the beginning of the module IJ is equivalent to insertion at the very end of a following module IJ+1 (in situations wherein execution of module IJ is always followed by execution of the following module IJ+1).

In view of the description in the preceding paragraph, it is readily apparent that customization manager 103 may prepare customized application software 106 that is to execute the additional software 113 in any manner (e.g. by insertion of the additional software 113 directly in an in-line manner into any of modules IJ−1, IJ, IJ+1, or e.g. by insertion of the additional software 113 indirectly as a function call to invoke execution of the additional software 113), when executing application software 102 at the user-specified position (e.g. beginning position 104IJB, in-between position at line number L or end position 104IJE).

At this stage, computer(s) 200 may optionally display the source code of customized module 104I (FIG. 1), e.g. via a browser that renders web pages on a video monitor 1112 of computer 110 for review and approval by an employee 111 of the customer, e.g. in response to user input requesting the display. In many embodiments, the source code of module 102IJ which is received as a portion of component 102I in generic application software 102 supplied by the software vendor, and the additional source code 113 which is received from the customer's employee 111 are both expressed in a common high-level programming language. Thus, the customer's employee 111 may review and understand customized module 104I) after it's been customized by insertion of additional source code 113 into module 102IJ.

When there is only one customization in database 120, customized component 104I includes, in addition to customized module 104I) (FIG. 1), one or more modules I1, IZ that are unchanged (when there is no applicable customization thereto). When there are multiple customizations of a component 102I, a corresponding customized component 104I obtained by modification thereof includes one or more customized modules and any modules that remain unchanged (again, if there is no applicable customization thereto). Also, when multiple components are customized, customized application software 106 includes all corresponding customized components obtained by modification thereof, and further includes any components that remain unchanged.

In several embodiments, computer(s) 200 include a compiler 115 that can compile source code expressed in the common high-level programming language described above. In such embodiments, compiler 115 may be transmitted by vendor's computer 100 to computer(s) 200 for use therein to compile the customized components. A common high-level programming language of compiler 115 can be, for example, the language PeopleCode which is an object-oriented language for writing software to implement business logic in one or more computers, for PeopleSoft applications. Thus, in an act 238 (FIG. 2), customization manager 103 compiles at least one customized module 104IJ, by using thereon compiler 115, to obtain compiled code of a customized component 105I in an executable application 105, followed by storing the executable application 105 in a non-transitory computer-readable storage media, such as memory 1106 (e.g. implemented as a RAM or a ROM, depending on the embodiment).

After act 235, customization manager 103 of some embodiments perform an optional act 236 to check if any more modules are to be customized and if so return to act 232 (described above). Moreover, after act 236, customization manager 103 of some embodiments is programmed with an optional act 237 to check if any more components are to be customized and if so return to act 231 (described above). An executable application 105 (FIG. 1B) created by customization manager 103 in act 238 is thereafter executed in act 239 (FIG. 2) in the normal manner, including execution of customized component 105I (in turn including execution of customized module IJ). Execution of executable application 105 generates output 114A, 114B that is different for the respective employees 111A, 111B of different customers A, B, depending on their corresponding additional software 113A, 113B which may be executed differently relative to the same generic application software 102, depending on their respective customizations 112A, 112B as illustrated in FIG. 1A.

Use of one or more field(s) in one or more GUI screen(s) to receive one or more customization(s) 112 as described above in reference to FIG. 2 is required initially, to prepare a database 120 in which the following items of information are related to one another: component name, module name, specific position in module, and identifier of additional software. The just-described items may be stored in columns of a table or a materialized view in a relational database, wherein each row identifies one customization. After the customization(s) 112 are stored in database 120, they may be used repeatedly (with or without user-specified updates thereto), to change multiple versions of the application software.

In several embodiments, user input on customizations is received via one or more webpage(s) generated by customization manager 103 (FIG. 2), which is/are displayed by a browser in computer 110 (FIG. 1) on a video monitor 1112 as a screen 103A (FIG. 3A). Screen 103A includes a field 301 in which employee 111 can identify a component, such as the component named EMPLOYEE_PROFILE, e.g. by typing in the name using a keyboard, or by selecting the name by using a cursor control 1113 (such as a mouse). In an example illustrated in FIG. 3A, displayed adjacent to field 301 is a down-arrow icon 323 that can be operated by placing a cursor thereon and clicking a button on the mouse, to display a drop-down list box 301D (FIG. 3B). Drop-down list box 301D displays several components of application software supplied by a software vendor to a customer that are available for customization by employee 111.

In several embodiments, all components in a set of components of the application software are displayed in drop-down list box 301D of screen 103A, although in certain embodiments only components in a subset (in the set of components of the application software) that was selectively made available by the vendor are displayed by customization manager 103 in the drop-down list box 301D. In the just-described certain embodiments, some components which are not in the displayed subset but included in the set of all components are not displayed in box 301D (i.e. hidden from display), as being not customizable by employee 111.

The application software may be, for example, software for an Enterprise Resource Planning (ERP) application, such as PeopleSoft and its components can be any application pages such as, Employee Profile 102A (FIG. 5B), Expense Reports 102I (FIG. 5B), Journal Entries 102N (FIG. 5B) etc. When a specific component is selected in field 301, a description of the component is displayed by customization manager 103 in field 320. At an initial stage, when there is no customization of user-selected component (e.g. component EMPLOYEE_PROFILE identified by the user input in field 301), there are no customizations in database 120 (FIG. 2), and hence a form 309 is displayed in screen 103B, with blank fields 302A, 306A, etc to be used to receive user input on a customization. For example, form 309 includes a field 302A to receive user input identifying a module to be customized in the user-selected component, fields 303A, 304A, 305A to receive user input identifying a specific position within the component identified in field 302A, and a field 306A to receive user input identifying a file of additional software to be added to the component identified in field 302A at a position identified in one of fields 303A, 304A or 305A.

In form 309, a magnifying-lens icon 302D is displayed located adjacent to field 302A (FIG. 3A), operation of which (by clicking on a mouse, with cursor on the icon) displays a file system window (not shown) in which are displayed several modules of the user-selected component any one of which can be selected in the normal manner, for use in customization by employee 111. In several embodiments, the file system window displays a path to a directory and names of files in the directory, in a manner similar to drop-down list box 301D, as follows. Specifically, in the several embodiments, all modules in a set of modules of a user-selected component I are displayed in the file system window (not shown), although in certain embodiments only modules in a subset (in the set of modules of the user-selected component I) that has been selectively made available by the vendor of the software are displayed by customization manager 103 in the file system window (FIG. 3B). As noted above, in the just-described certain embodiments, some modules which are not in the displayed subset but included in the set of all modules of component I are not displayed in the file system window (i.e. hidden from display), as being not customizable by employee 111.

Although certain illustrative features have been described above in reference to FIG. 3A, other features may be used in other embodiments of screen 103A. For example, other embodiments may display in screen 103A, a down-arrow icon 323 instead of a magnifying-lens icon 302D and vice versa. Moreover, instead of displaying a drop-down list box in screen 103A, on operation of icon 302D other embodiments may open a file system window to receive user input identifying a path to a file in a directory of the file system, or alternatively receive a uniform resource locator (URL). Similarly, instead of displaying a file system window on operation of magnifying-lens icon 302D, other embodiments may display a drop-down list box.

In an example illustrated in FIG. 3C, user input in field 302A of customization form 309A has selected "RowInit" as the module to be customized. In addition, user input in customization form 309A, by clicking the mouse with the cursor on field 303A, selects "Beginning" as a specific position in the module to be customized (i.e. module RowInit). Instead of "Beginning", user input can select the specific position to be "End" by clicking on field 304A or select the specific position to be "In Between" by clicking on field 305A (to be followed by identifying a line number L in another field, as illustrated by field 308B in customization form 309B shown in FIG. 3D).

Referring back to the example of FIG. 3C, user input in field 306A of customization form 309A (in a manner similar or identical to field 302A or field 301) has selected a file named "StartofRowInit" as containing the additional software to be added to the to-be-customized module (i.e. module RowInit) at the specific position (i.e. Beginning) Thus, user input in the fields 302A, 303A, and 306A of customization form 309A has uniquely identified a customization 112 as the following 4-tuple: (EMPLOYEE_PROFILE, RowInit, Beginning, StartofRowInit). At this stage, employee 111 may provide user input in a field 311 (FIGS. 3A, 3B) to change the status of the newly-created customization 112 from "Inactive" to "Active" (FIG. 3C), which instructs customization manager 103 to perform act 238 (described above in reference to FIG. 2). Alternatively, as per act 236 (FIG. 2), employee 111 may provide user input for additional customizations, in customization forms 309B and 309C (in a manner similar or identical to form 309A), as illustrated in FIG. 3D and then change the status for all these newly-created customizations from "Inactive" to "Active."

At any stage after a customization form 309A, 309B or 309C is completed, computer(s) 200 may optionally display the source code of the respective customized module on a video monitor 1112 in response to user input, e.g. by clicking on a corresponding link 307A, 307B or 307C in the respective form 309A, 309B or 309C. FIG. 3E illustrates one such display in response to employee 111 clicking on link 307B (FIG. 3D), wherein vendor-supplied software of module 102IJ named "RowInit" has been customized at line 7 by insertion of additional source code 113 from the file named "RowInitatLine7" to obtain the customized module 104U.

Figure 3G:
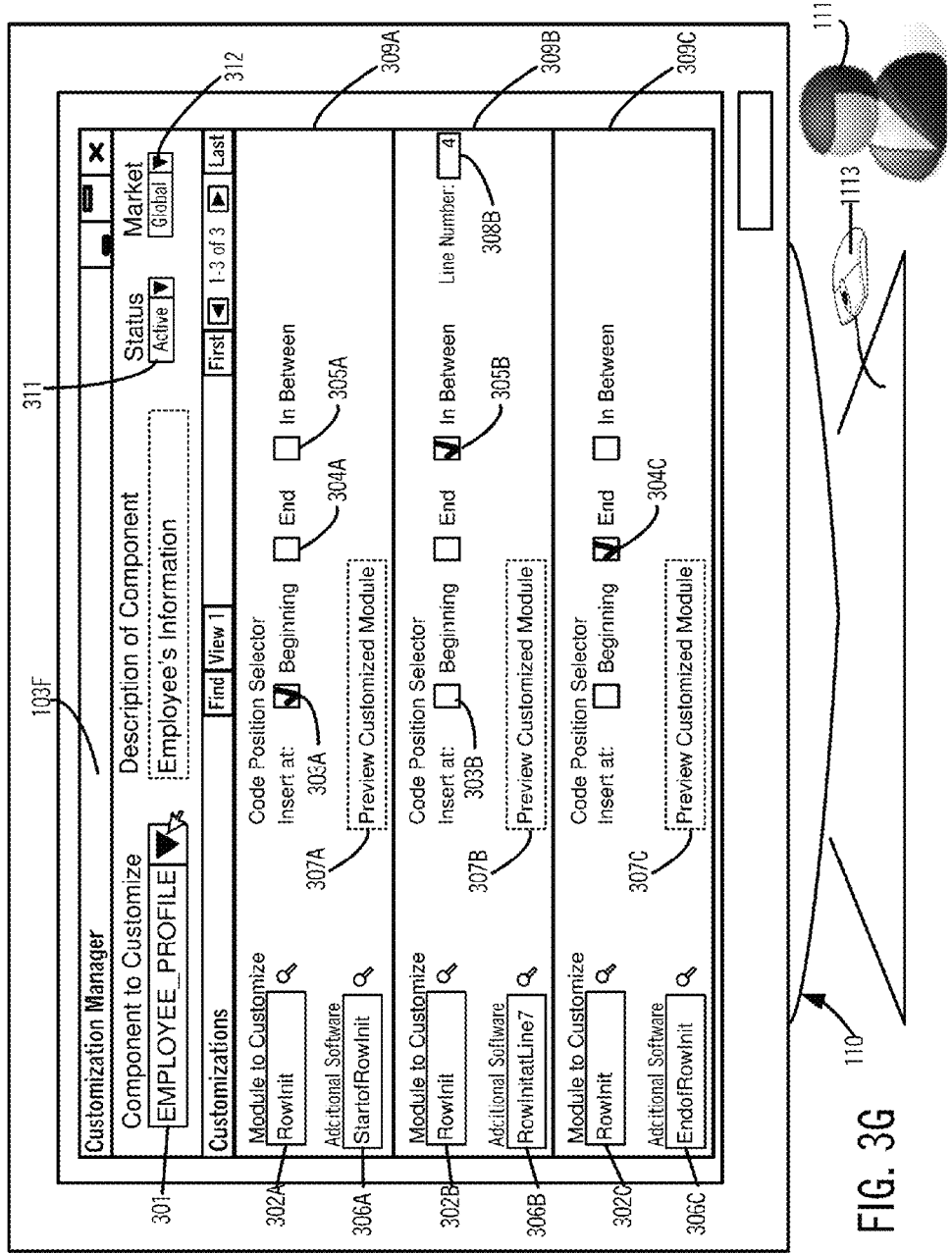

In a display of the type illustrated in screen 103E (see FIG. 3E), employee 111 may change the specific position at which the additional software is inserted, e.g. by moving the mouse to place the cursor on any line (which is different from line number L identified in field 308B) and operating a mouse button thereon, following which the corresponding customization is automatically changed by customization manager 103. For example, if employee 111 places the cursor on line 4 (shown in the left column of FIG. 3E) and clicks on a mouse button, the additional source code 113 is automatically removed from line 7 and inserted between line 3 and line 4 (as shown in FIG. 3F), and in response to employee 111 closing this screen 103E, the field 308B is automatically updated from line 7 in earlier-displayed screen 103D now updated to line 4 in screen 103G (see FIG. 3G). In the screen 103F illustrated in FIG. 3F, all newly-inserted lines of source code of additional software 113 are shown without line numbers in a column in the left side of screen 103F, and the source code of application software in module 102IJ are shown with line numbers in the just-described column.

Figure 4A:
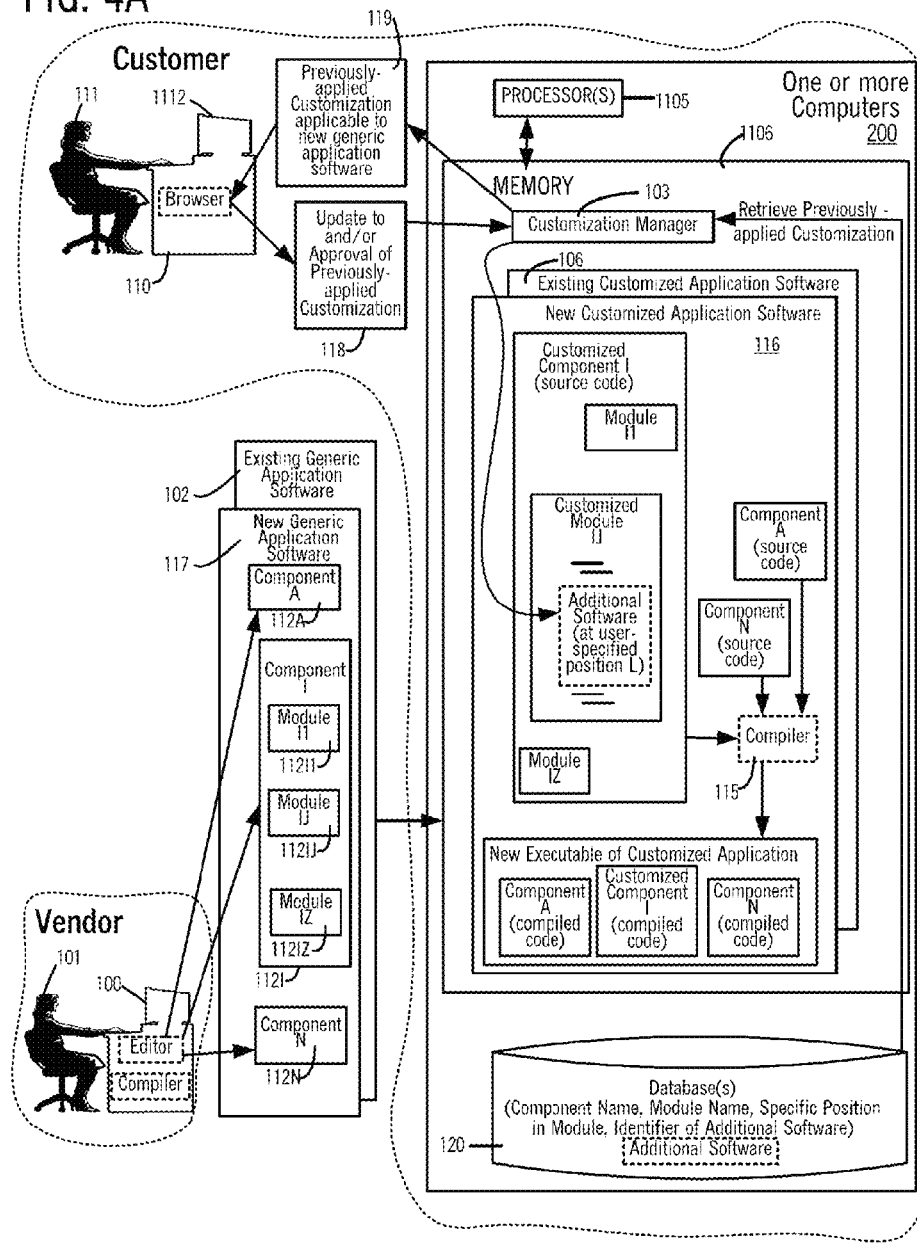
FIG. 4A shows, in a data flow diagram vendor's computer 100 transmitting to customer's computer(s) 200, one version of application software 102 ("existing generic application software") customized by customizations as described above in reference to FIGS. 1A and 1B, followed transmission of another version of application software 112 ("new generic application software") customized by previously-applied customizations that may be approved unchanged or after being updated by user input, in some illustrative embodiments.

In some embodiments, a generic version of application software ("existing generic application software") 102 is initially customized in an act 235 (FIG. 2) by application of customizations received via user input as per acts 231-234 (FIG. 2), to obtain an existing customized version of application software 106 (FIG. 4A). Subsequently, a new generic version of application software 117 is received by computer(s) 200, followed by retrieval from database 120 by customization manager 103 of one or more previously-applied customizations that are applicable to the new generic version. The retrieved customizations 119 are displayed and optionally updated as per user input 118 received from employee 111, and when the user input includes approval they are applied by customization manager 103 to the new generic version of application software 117 resulting in a new customized version of application software 116 (FIG. 4A), for example as described below in reference to FIG. 4B.

Customizations 112 and additional software 113 of most embodiments are stored independent of and in addition to existing customized application software 106, e.g. by being stored in a database 120 and/or in a file system 130, which may be implemented on one or more non-transitory storage media such as a hard disk accessible to computer(s) 200. Specifically, in several embodiments, additional software 113 of each customization is modularized and stored separately (e.g. in database 120 as a large object or LOB, or in file system 130 as a file), which prevents the additional software 113 from being overwritten when existing customized application software 106 is upgraded by (e.g. overwritten by) new generic application software 112.

Hence, any customization 119 that was previously applied to customize existing generic application software 106 is available for application (on approval by user input, with or without being updated by additional user input 118) on the new generic application software 112, e.g. when the new generic version has modules of names identical to names of modules in the existing generic version. In several such embodiments, customization manager 103 displays on monitor 1112 any previously-applied customizations 119 that are applicable to the new generic version of application software 117. In this manner, customization manager 103 eliminates a need for employee 111 to manually maintain a list of customizations.

Customizations which are displayed for user approval are selected in some embodiments, by matching module names in the new generic version of application software 117 to module names identified in customizations stored in the database 120. Although module names are compared for being identical to one another in the two versions in some embodiments, to identify applicability of existing customizations to new generic application software 112, other embodiments enable module names to differ across the two versions, e.g. by use of a map that identifies for each module in the new generic application software 112 a corresponding module in existing generic application software 106. Hence, such a map is transmitted from vendor's computer 100 to computer(s) 200, either internal to or external to new generic application software 112, depending on the embodiment.

Furthermore, storage of customizations 112 in database 120 enables each of customers A and B to independently isolate and track custom changes required only by that customer I (wherein I=A or I=B), which helps in applying maintenance patches provided by software vendors, and enables each customer I to reapply their custom changes with less efforts and time. Moreover, when a customer I upgrades to the new generic version of application software 102, their own customizations are easily re-applied with minimal time and effort. Thus, use of customization manager 103 results in substantial savings in terms of time and effort and minimize the total cost of ownership of application software.

Figure 4B:
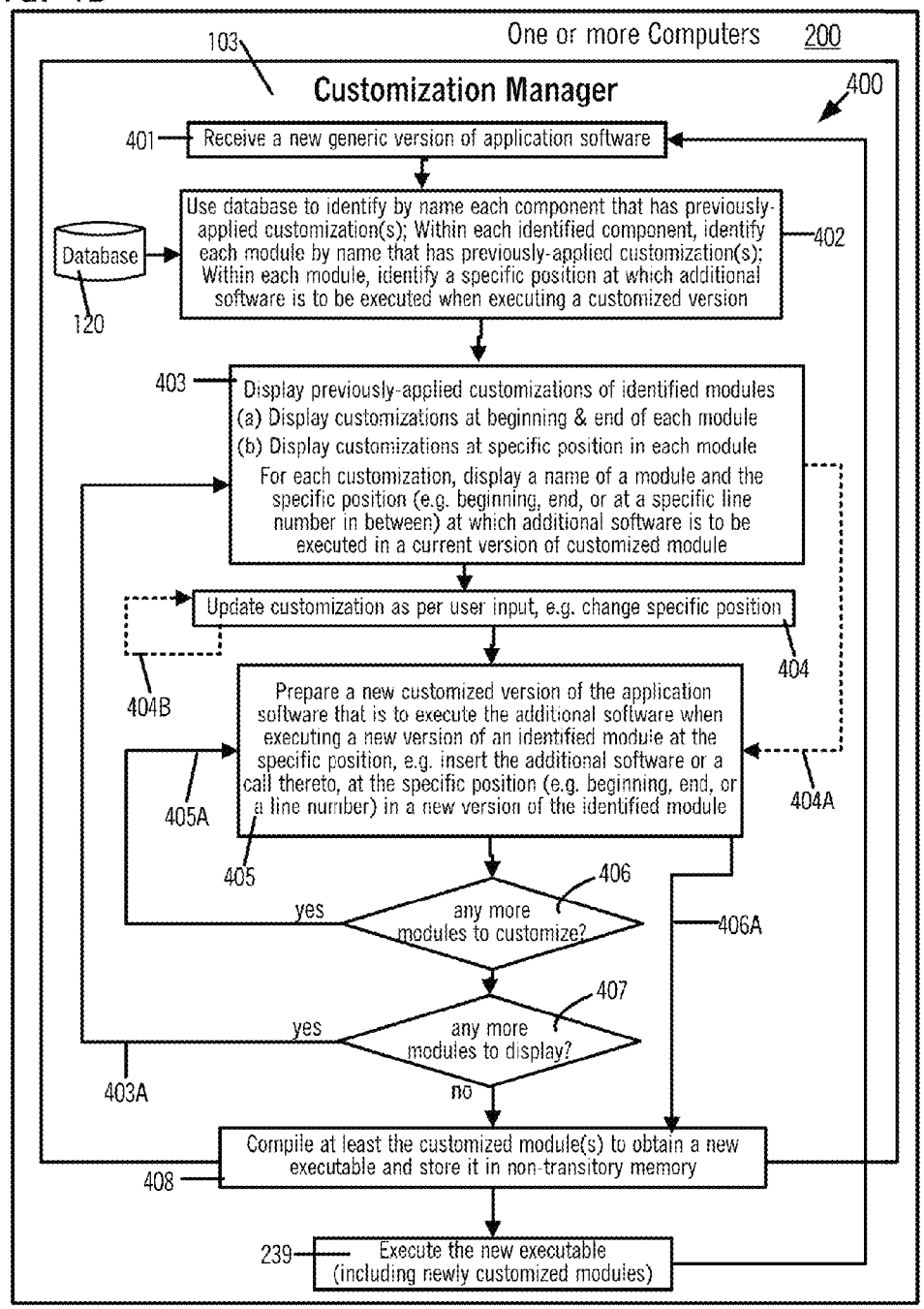
FIG. 4B illustrates, in a flow chart, acts performed by one or more computers 200 (in addition to the acts of FIG. 2) by use of one or more processors programmed with a sequence of instructions of software stored in one or more memories, to customize a new version of application software based on previously-applied customizations that may be approved unchanged or approved after update in exemplary embodiments of a customization manager, in accordance with the invention.

Thus, after one or more customization(s) 112 (FIG. 1B) are created and stored in database 120 as described above in reference to act 234 in FIG. 2, the stored customization(s) are initially applied as per act 235 (FIG. 2) to existing generic application software 102 (FIG. 4A) and subsequently these previously-applied customizations are re-applied to new generic application software 117 (FIG. 4A) when computer(s) 200 are programmed with a method 400, which includes acts 401-408 (FIG. 4B). In method 400, a new version of application software 117 is transmitted from vendor's computer 100 and received by computer(s) 200 in an act 401 (FIG. 4B). After receipt of the new version of application software 117, in an act 402, customer's computer(s) 200 use database 120, to identify for each component received in act 401, any customizations thereof present in database 120, based on the component names being identical (e.g. by comparing each component's name in the new version of application software 117 with each component's name in the existing version of application software 102).

For application software in which modules are grouped into components, computer(s) 200 loops over each component I received in act 401, and within the loop for each component I computer(s) 200 further loops over each module IJ received in act 401, and executes an SQL query on database 120 to identify module names that are identical to retrieve their corresponding customizations (i.e. identify those n-tuples in database 120 in which the name of component I is one of the elements, and the name of module IJ is another of the elements that respectively match a component name and a module name in the new version of application software 117). In an example described above, computer(s) 200 identify in act 402 three customizations (see forms 309A, 309B and 309C in FIG. 3D) for component EMPLOYEE_PROFILE, and module RowInit. In some embodiments, on completion of the looping described in this paragraph, computer(s) 200 identify all customizations in database 120 that identically name a module in new version of application software 117. Only previously-applied customizations 119 in database 120 which are applicable to new generic application software 117 are identified in act 402 (i.e. customizations of any modules of existing generic application software 102 in database 120 which are not named identically as modules of new generic application software 117, are thus not identified in act 402).

Also, at this stage, an element in each customization identified on completion of act 402, identifies a specific position within existing generic application software 102 (although at this stage, not within new version of application software 117 in which the identically named module may or may not have changed e.g. by addition of new lines and/or by deletion of existing lines of code). Hence, in an act 403, the previously-applied customizations retrieved from database 120 by act 402 are displayed by customization manager 103 to employee 111. In several embodiments of act 403, computer(s) 200 prepare screens to display to employee 111 (e.g. via a browser in computer 110), for each previously-applied customization 119, at least a name of a module and a specific position (e.g. beginning, end, or at a line number) at which additional software was previously inserted (to prepare an existing version of customized module).

Figure 4C:
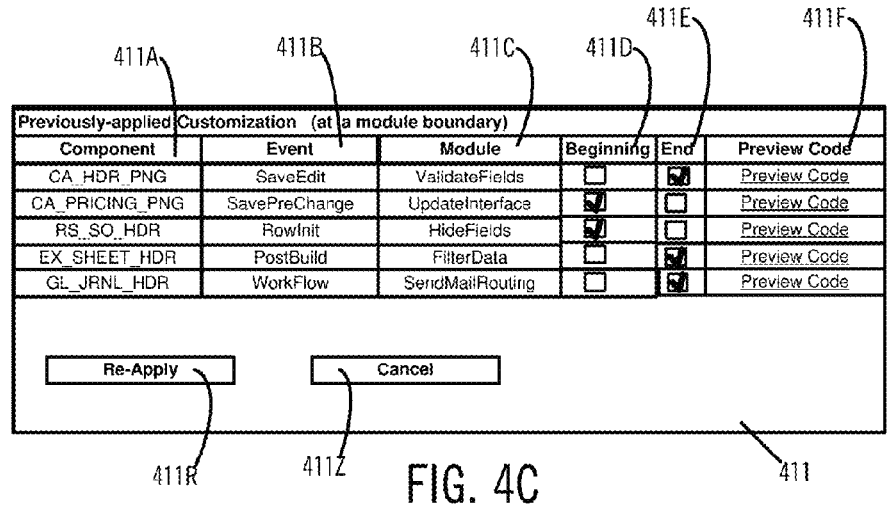
FIGS. 4C and 4D illustrate screens generated by one or more computers 200 in performing acts of the type illustrated in FIG. 4B.

A specific format in which one or more previously-applied customizations 119 (FIG. 4A) are displayed on video monitor 1112 can be different, depending on the embodiment. A subset of previously-applied customizations 119 (FIG. 4A) which are to be applied at a boundary of a module (e.g. at the beginning of a module before the first line therein or at the end of the module after the last line therein) are unlikely to be updated by customer's employee 111 regardless of whether or not the corresponding module has been changed by employee 101 of the software vendor, and hence in some embodiments this subset is displayed by customization manager 103 in a table of the type shown in screen 411 (FIG. 4C). Customizations 119 which are not at module boundaries, i.e. applicable at a line number L between the beginning and the end of a module, are more likely to be updated by employee 111 if the module has been changed by the vendor, and hence in such embodiments each customization in this subset is displayed by customization manager 103 in its own panel in another screen 412 (FIG. 4D) which displays a list of panels. Instead of the just-described two-screen display, certain embodiments may display all previously-applied customizations 119 (FIG. 4A) in a single screen, similar or identical to the above-described screen 103D (FIG. 3D).

When one or more customizations 119 (FIG. 4A) are displayed (as per act 403), employee 111 can change a customization, e.g. by changing a previously-specified position which may be at a beginning of a module (e.g. see field 303A in screen 309A) to a newly-specified position which may be in between the beginning and the end of the module (e.g. at line number 7, as shown in field 305B in FIG. 3D) or vice versa. In response to any change in a customization 119 indicated by user input 118, computer(s) 200 update that customization 119 in database 120 correspondingly. For example, a change in a specific position at which additional software is to be executed may be necessitated, for example, if a new version of the module (e.g. module RowInit in FIG. 3D) contains new instructions at the beginning, in which case employee 111 may specify that the additional software 113 is to be executed after these new instructions (e.g. change from beginning to in-between at a user-specified line number). As per branch 404B (FIG. 4B), employee 111 may make any number of changes to displayed customizations, and each change made by user input 118 is in turn used by computer(s) 200 to update the corresponding customization in database 120 and the updated customization is used to customize the new generic application software 117.

As noted above, customizations that were previously applied at a boundary of a module are unlikely to be changed and to facilitate speedy approval in such situations, screen 411 (FIG. 4C) includes a table with one row for each customization at module boundary, in the following four columns: Component column 411A, Module column 411C, Beginning column 411D, and End column 411E. Component column 411A displays names of components in the application software to which at least one customization in database 120 is found to be applicable. Module column 411C displays names of modules in the application software to which at least one customization in database 120 is found to be applicable. Beginning column 411D indicates by presence of a check mark therein that additional software identified by the customization is to be inserted at the beginning of the module identified in the module column 411C. End column 411E indicates by presence of a check mark therein that additional software identified by the customization is to be inserted at the end of the module identified in the module column 411C.

In each row of the table in screen 411, a check mark is present in only one of the Beginning column 411D or End column 411E, not both (in situations wherein the additional software is to be executed at the identified module's boundary). In addition to the above-described four columns, the table in screen 411 of some embodiments may include an additional column, namely Preview Code column 411F, with a hyperlink in each row clicking on which opens a screen of the type illustrated in FIGS. 3E and 3F. In some embodiments, application software 102 is event oriented and in such embodiments, screen 411 includes an additional column in the table, namely Event column 411B, in which the names of events are displayed, whereby a module in a row is invoked by the application software (e.g. written in PeopleCode) on occurrence of a corresponding event identified in that row.

As shown in FIG. 4C, screen 411 displays a button 411R labeled "Re-Apply", operation of which causes customization manager 103 to take branch 404A (FIG. 4B), from act 403 to act 405 in which all module boundary customizations shown in screen 411 are applied to the new version of application software 117. Note that operation of button 411R labeled "Re-Apply" provides user input as an indication to computer(s) 300 that the specific position is unchanged in the previously-applied customization(s) which are currently displayed in screen 411. Hence, least for the modules identified in the previously-applied customization(s) displayed in screen 411, the corresponding additional software has been approved by the user, for execution at the same respective specific position(s) in new version of application software 117 (FIG. 4A) as in the existing version of application software 102.

In some embodiments, just before performing act 405 (FIG. 4B), the above-described act 234A is performed, to check if the customization(s) is/are indicated as activated (e.g. via user input in status field 311, shown in FIGS. 3A and 3C). Then, in act 405, in a manner similar to that noted above for act 235, the previously-applied customizations shown in screen 411 are now re-applied, e.g. directly by insertion of the additional software 113 identified by each previously-applied customization 119 (FIG. 4A), into corresponding modules of the new generic application software 117 (or indirectly by insertion of a function call to invoke execution of additional software 113, as noted above).

Figure 4D:
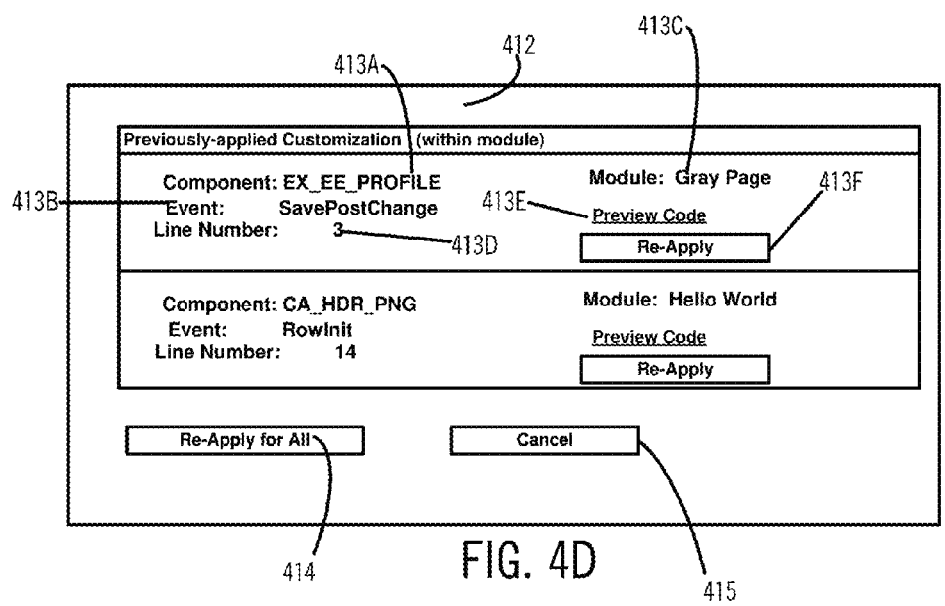

After the (direct or indirect) insertion in act 405, in several embodiments, customization manager 103 goes to act 403 to display in screen 412 (FIG. 4D), one or more previously-applied customization(s) that were identified in act 402 and are still to be applied. For example, in act 403, one or more previously-applied customizations 119 (FIG. 4A) which are to be applied at a specific line number within each module are displayed, as illustrated in screen 412 (FIG. 4D). Screen 412 of some embodiments includes multiple panels, one panel for each customization 119, wherein a first panel 413 displays the following fields: Component 413A, Event 413B, Module 413C, Line Number 413D, and Preview Code 413E. As noted above, Preview Code 413E has a hyperlink which opens a screen of the type illustrated in FIGS. 3E and 3F.

Line Number 413D is a field that is editable by user input. Thus, depending on whether or not application software has changed in Module 413C, employee 111 may or may not change field 413D, and then operate the re-apply button 413F. User input to update field 413D may be provided directly by employee 111 typing a number on a keyboard, or provided indirectly by employee 111 clicking on a mouse button in a preview screen 103E illustrated in FIG. 3E which automatically moves the previously-applied software to a new line in screen 103F illustrated in FIG. 3F, as described above. Independent of a specific mechanism by which the user input is provided to update field 413D, such an update is an indication of a change in the specific position at which the new version of application software 117 (FIG. 4A) is to execute the corresponding additional software 113. Hence, a specific position in the existing version of application software 102 is changed to a new specific position in the new version of application software 117, based on the just-described indication. More specifically, operation of button 413F results in the specific position that was previously stored in database 120 being overwritten by a new specific position identified by user input in field 413D. Moreover, this new specific position is thereafter used in application of the customization, specifically by inserting the additional software into the new generic application software 117, at the new specific position.

Note that panel 413 displays a re-apply button 413F which is individually operable to re-apply a customization as displayed in panel 413 independent of any other customization. To cover situations in which there are no changes needed for all previously-applied customizations 119, screen 412 includes a button 414 operable to re-apply all customizations displayed in screen 412. Operation of button 414 eliminates the need for employee 111 to operate individual re-apply buttons 413F in each individual panel in screen 412 for each customization. Screen 412 also includes a cancel button 415 operable to cancel all customizations displayed in screen 412.

After insertion in act 405, customization manager 103 goes via branch 406A (FIG. 4B) to act 407 to compile the customized modules (in a manner similar or identical to act 238 described above in reference to FIG. 2). In some embodiments, the compilation in act 407 is performed in response to the status (in field 311 in FIG. 3A) being changed from "Inactive" to "Active" (as shown field 311 in FIG. 3C). In some embodiments, the compilation in act 407 is performed on a version of the application software that is applicable to a market which is specified in field 312 (FIG. 3C). For example, when the market is specified in field 312 to be global, then the customizations all applied to versions of the application software, regardless of locale. But if a market specified in field 312 is, for example, "North America" then compilation in act 407 is performed on only one version of the application software (which is pre-configured, to be executed by employees 111 who are known to be physically located in the continent of North America). After act 407, the executable generated by act 407 is executed in act 238 in the normal manner, thereby to execute the new version of the application software 116 customized by the customizations 119.

Figure 5A:
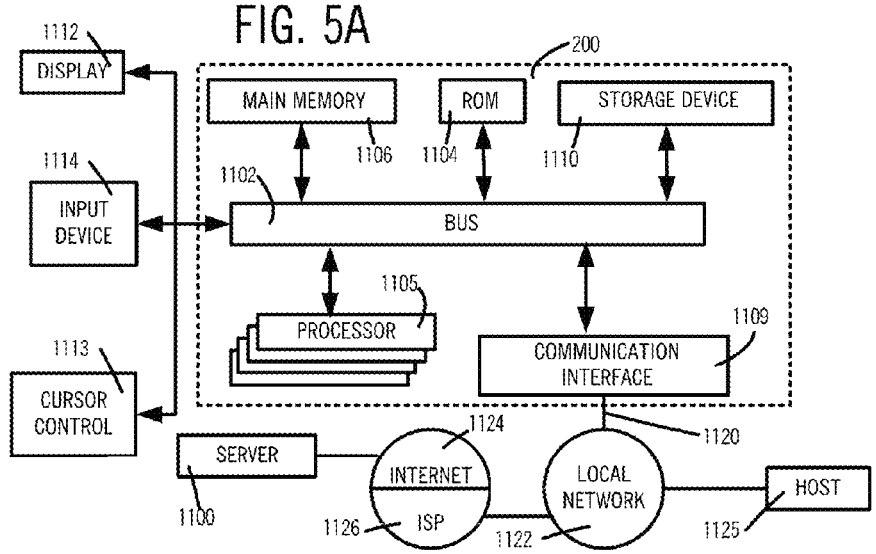
FIG. 5A illustrates, in a block diagram, hardware portions of one or more computers 200 programmed with software portions of the type illustrated in FIG. 5B or 5C to perform one or more acts illustrated in FIGS. 2 and 4B in some embodiments.

The act(s) illustrated in FIGS. 2 and 4B may be used to program one or more computer(s) 200 each of which may be implemented as illustrated in FIG. 5A and discussed below. Thus, depending on the embodiment, computer(s) 110 used by a customer's employee(s), and/or computer(s) 200 used in a cloud may be programmed to perform one or more or all of acts 231-239, and 401-408 in whole or in part, and in any combination with one or more hardware components described in reference to computer(s) 200 below.

In some embodiments, computer(s) 200 includes a bus 1102 (FIG. 5A) or other communication mechanism for communicating information, and one or more processor(s) 1105 coupled with bus 1102 for processing information. Computer(s) 200 uses (as the above-described memory) a main memory 1106, such as a random access memory (RAM) or other dynamic storage device, coupled to bus 1102 for storing information and instructions (e.g. to perform act(s) of FIGS. 2A and 3A) to be executed by processor(s) 1105.

Main memory 1106 (FIG. 5A) also may be used for storing temporary variables or other intermediate information during execution of instructions (e.g. in modules 461-466) by processor 1105. Computer(s) 200 further includes a read only memory (ROM) 1104 or other static storage device coupled to bus 1102 for storing static information and instructions for processor 1105, such as software in the form of a browser. A storage device 1110, such as a magnetic disk or optical disk, is provided and coupled to bus 1102 for storing information and instructions.

Computer(s) 200 (FIG. 5A) may be coupled via bus 1102 to a display device or video monitor 1112 such as a cathode ray tube (CRT) or a liquid crystal display (LCD), for displaying information (e.g. via a browser) to a computer user (e.g. user 111) on the display 1112. An input device 1114, including alphanumeric and other keys (e.g. of a keyboard), is coupled to bus 1102 for communicating information (such as user input, e.g. from any user 111) to processor 1105. Another type of user input device is cursor control 1113, such as a mouse (described above), a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane. In addition to display device 1112 on which output 114A, 114B (FIG. 1A) may be displayed, computer(s) 200 may include a speaker (not shown) as another output device for use by processor 1105 in interacting with any user(s) 111 (such as respective employees 111A, 111B).

As described elsewhere herein, execution of customization manager 103 (FIG. 4B) in computer(s) 200 (FIG. 5A) may be implemented by one or more processor(s) 1105 executing one or more sequences of one or more instructions that are contained in main memory 1106. Such instructions may be read into main memory 1106 from another non-transitory computer-readable storage medium, such as storage device 1110. Execution of the sequences of instructions contained in main memory 1106 causes processor 1105 to create, store and update customizations, and to create customized component 1041 and customized application software 106 as illustrated in FIGS. 2 and 4B and/or to display screens as illustrated in FIGS. 3A-3G. In alternative embodiments, hard-wired circuitry may be used in place of or in combination with software instructions to perform act(s) illustrated in FIGS. 2 and 4B.

The term "non-transitory computer-readable storage media" as used herein refers to any non-transitory storage media that participate in providing instructions to processor 1105 for execution. One or more such non-transitory storage media may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by computer(s) 200. Volatile storage media includes dynamic memory, such as main memory 1106 which may be implemented in the form of a random access memory or RAM.

Instructions to processor 1105 can be provided by a transmission link or by a non-transitory storage medium from which a computer can read information, such as data and/or code. Specifically, various forms of transmission link and/or non-transitory storage medium may be involved in providing one or more sequences of one or more instructions to processor 1105 for execution. For example, the instructions may initially be comprised in a non-transitory storage device, such as a magnetic disk, of a remote computer. The remote computer can load the instructions into its dynamic memory (RAM) and send the instructions over a telephone line using a modem.

A modem local to computer(s) 200 (FIG. 5A) can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer(s) 200 (FIG. 5A) also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 (FIG. 5A) typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer(s) 200, are exemplary forms of carrier waves transporting the information.

Computer(s) 200 (FIG. 5A) can send messages and receive data, including program code, through the network(s), network link 1120 and communication interface 1115. In the Internet example, a server 1100 might transmit information retrieved from RDBMS database through Internet 1124, ISP 1126, local network 1122 and communication interface 1115. The instructions for performing the operations of FIG. 2 or 4B may be executed by processor 1105 as they are received, and/or stored in storage device 1110, or other non-volatile storage for later execution. In this manner, computer(s) 200 may additionally or alternatively obtain instructions and any related data.

Figure 5B:
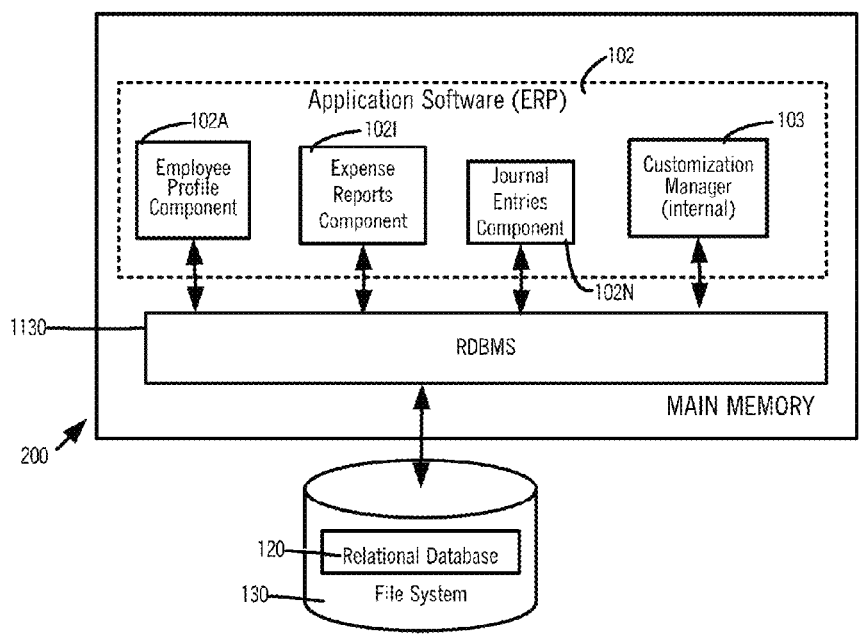
FIGS. 5B and 5C illustrate, in block diagrams of alternative embodiments, one or more computers 200 of the type shown in FIG. 5A programmed with software to perform one or more acts illustrated in FIGS. 2 and 4B, in a customization manager 102 that is either internal to or external to application software 102.

FIG. 5A is a very low-level representation of many hardware components of one or more of computer(s) 200 described above in reference to FIGS. 1, 2, 3A-3G, and 4A-4D. Several embodiments have one or more additional software components in main memory 1106 as shown in FIG. 5B. In addition to main memory 1106, computer(s) 200 may include one or more other types of memory such as flash memory (or SD card) and/or a hard disk and/or an optical disk (also called "secondary memory") to store data and/or software for loading into memory 1106 (also called "main memory") and/or for use by processor(s) 1105. In some embodiments, computer(s) 200 of FIG. 5A implements a relational database management system 1130 (FIG. 5B) to manage data in one or more tables of a relational database 120 of the type illustrated in FIG. 5B. Such a relational database management system may manage a distributed database system that includes multiple databases, each table being stored on different storage mechanisms.

In some embodiments, the multiple databases are made to appear as a single database. In such embodiments, processor 1105 can access and modify the data in a relational database 120 via RDBMS 1130 (FIG. 5B) that accepts queries from various modules I1-IZ (FIG. 4A) in conformance with a relational database language, the most common of which is the Structured Query Language (SQL). The commands are used by processor 1105 of some embodiments to store, modify and retrieve customizations 112A, 112B (FIG. 1A) in the form of rows in tables in relational database 120 and additional software 113A, 113B (FIG. 1A) in the form of LOBs.

Relational database management system 1130 (FIG. 5B) further includes output logic that makes the data in a database table of relational database 120 available to a user via a graphical user interface that generates a screen on a video monitor display 1112, such as the screens illustrated in FIGS. 3A-3G and 4C-4D. In one example, the output logic of computer(s) 200 provides output 114A, 114B (FIG. 1A) via a web-based user interface that depicts in a browser of another computer 100, information related to customizations, etc as illustrated in any one or more of FIGS. 3A-3G, and 4C-4D. Additionally and/or alternatively, screens responsive to user input via a keyboard as a command in a command-line interface of computer 100 and/or user input via a mouse and a cursor displayed on a video monitor of computer 100 may be generated by computer(s) 200.

In some embodiments of computer(s) 200, functionality in the above-described operations or acts of FIGS. 2 and 4B is implemented by processor 1105 (FIG. 5A) executing software in memory 1106 of computer(s) 200, although in other embodiments such functionality is implemented in any combination of hardware circuitry and/or firmware and/or software in computer(s) 200. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing operations or acts of FIGS. 2 and 4B can, but need not necessarily include, one or more microprocessors, embedded processors, controllers, application specific integrated circuits (ASICs), digital signal processors (DSPs), multi-core processors and the like, appropriately programmed with software in the form of instructions to implement one or more steps of the type described herein.

Any non-transitory computer-readable medium tangibly embodying software (also called "computer instructions") may be used in implementing one or more acts or operations described herein and illustrated in FIGS. 2 and 4B. Such software may include program codes stored in memory 1106 and executed by processor 1105 (FIG. 5A). Memory 1106 may be implemented within or external to processor 1105, depending on the embodiment. When implemented in firmware and/or software, logic to perform one or more acts or operations of FIGS. 2 and 4B may be stored as one or more computer instructions or code on a non-transitory computer-readable medium.

Figure 5C:
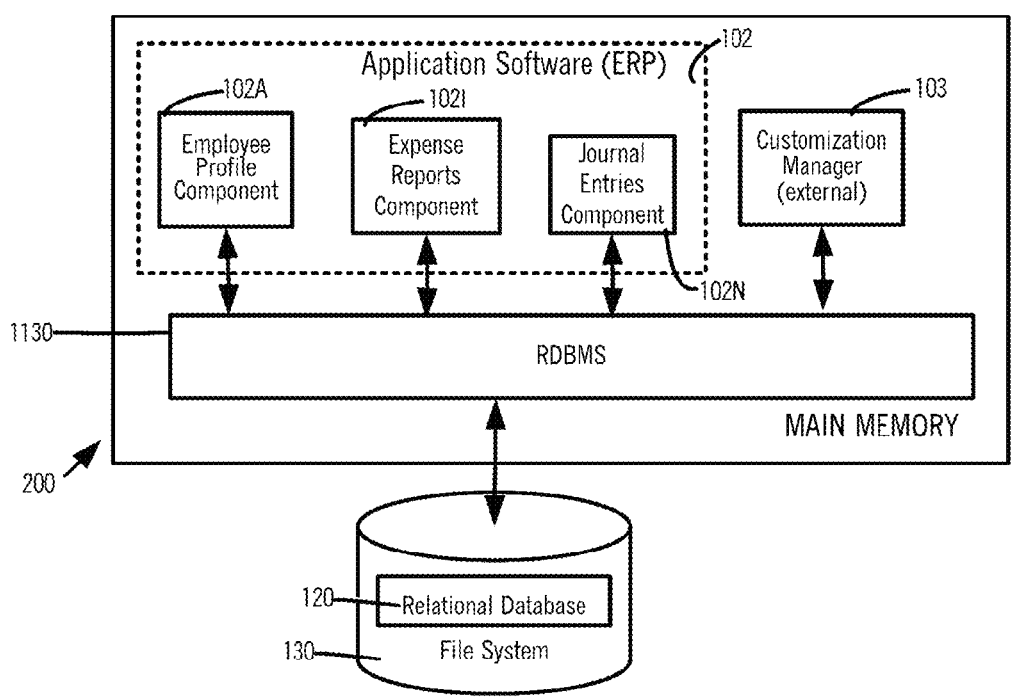

In some embodiments, one or more of computer(s) 200 may include multiple processors, each of which is programmed with software in a memory 1106 shared with each other to perform acts of the type described above to implement the individual modules I1-IZ illustrated in FIG. 4A. For example, a first processor 1105 in computer(s) 200 may be programmed with software in memory 1106 to implement a receiving circuit that receives a new version of application software from a software vendor's computer 100. A second processor 1105 in computer(s) 200 may be programmed with software in memory 1106 (FIG. 5A) to implement a displaying circuit that displays a name of a module in the application software and another displaying circuit that displays an indication of a specific position in the module at which additional software was inserted to prepare a current version of a customized module. A third processor 1105 in computer(s) 200 may be programmed with software in memory 1106 to implement a customization circuit that prepares and store a customized version of the application software that is to execute the additional software when executing a new version of the module at the specific position identified by the indication. A fourth processor 1105 in computer(s) 200 may be programmed with software in memory 1106 to implement an execution circuit that executes at least a new executable that is based on the new version of the customized module. The just-described four processors 1105 are programmed to interoperate with one another to form a customization manager 103, which depending on the embodiment is implemented internal to application software 102 (as illustrated in FIG. 5B) or external to application software 102 (as illustrated in FIG. 5C), or partly internal and partly external as will be apparent to a skilled artisan.

Although four processors 1105 (FIG. 5A) have been just described for some embodiments to implement the respective means, in other embodiments a single processor 1105 may be used in a time shared manner to implement the just-described means of the previous paragraph. Furthermore, in still other embodiments, one processor 1105 may be used in a time-shared manner to implement one or more parts of various modules. Moreover, one or more processors 1105 may be programmed to implement one or more components of application software 102, such as Employee Profile 102A (FIG. 5B), Expense Reports 102I (FIG. 5B), Journal Entries 102N (FIG. 5B), in addition to customization manager 103. Furthermore, although processors 1105 have been described above for certain embodiments as being included in a single computer(s) 200, in other embodiments multiple such processors 1105 may be included in multiple computers 200, for example four computers 200 may implement the operations described above in reference to FIGS. 1, 2, 3A-3G, and 4A-4D. Additionally, in one or more such embodiments, one or more processor(s) 1105 with a bus 1103 execute ERP software 102 (FIG. 5B) in computer(s) 200.

Various adaptations and modifications may be made without departing from the scope of the described embodiments. Numerous modifications and adaptations of the embodiments described herein are encompassed by the attached claims.

The invention claimed is:

1. A method implemented by at least one computer, the method comprising:
   receiving, via a field of a first screen of a graphical user interface, a first specific position within a first existing module, at which additional software is to be executed, during execution of an existing generic version of application software that comprises a plurality of modules including the first existing module;
   wherein the first specific position is selected, by user input in the first screen, to be at a beginning of the first existing module, or at an end of the first existing module, or at a specific line number in between the beginning and the end of the first existing module;
   receiving the additional software;
   storing in a database, a customization that comprises a first name of the first existing module, and the first specific position within the first existing module;
   receiving a new generic version of the application software;
   automatically identifying, in the new generic version of application software, by use of at least one processor and the customization in the database, a first new module having a first name identical to the first name of the first existing module in the existing generic version of the application software, the first existing module being associated with the additional software to be executed when executing an existing customized version of the application software;
   receiving via a second screen of the graphical user interface, a new specific position at which the additional software is to be executed in the first new module when executing a new customized version of the application software;
   automatically preparing and storing in one or more non-transitory computer-readable storage media, the new customized version of the application software to execute the additional software when executing the first new module in the new generic version of the application software;
   wherein the new customized version of the application software is obtained, based on the new specific position, by automatic insertion of the additional software, directly or via a function call, into the new generic version of the application software; and
   executing a new executable based on the new customized version of the application software.

2. The method of claim 1 further comprising:
   after receipt of the new generic version and before the executing, receiving an indication via a re-apply button in the second screen that the new specific position is unchanged.

3. The method of claim 1 wherein during the executing, the additional software is executed at the new specific position in the first new module.

4. The method of claim 1 wherein:
   L is the specific line number in the first existing module such that $1 < L < T$ with T being a total number of lines of source code in the first existing module; and
   the method further comprises receiving an indication of the specific line number L.

5. The method of claim 1 wherein:
   the first existing module comprises a plurality of first instructions in source code form;

the additional software comprises a plurality of second instructions in source code form;
a first customized module in the existing customized version of the application software comprises the plurality of first instructions and the plurality of second instructions;
the method further comprises:
preparing a third screen to display the first customized module; and
displaying the third screen, wherein the plurality of first instructions are displayed with line numbers and the plurality of second instructions are displayed without line numbers.

6. The method of claim 1 wherein:
the first existing module comprises a plurality of first instructions in source code form;
the additional software comprises a plurality of second instructions in source code form; and
the plurality of first instructions and the plurality of second instructions are expressed in a common high level language.

7. The method of claim 2 wherein:
the second screen displays multiple customizations including said customization;
the specific position in each of the multiple customizations is at a module boundary;
the module boundary is at the beginning or the end of a module; and
the re-apply button is common to all the multiple customizations on the second screen.

8. The method of claim 2 wherein:
the second screen displays multiple customizations including said customization;
said customization identifies the specific line number and the re-apply button is specific to said customization; and
the second screen displays another re-apply button applicable to another customization among the multiple customizations.

9. One or more non-transitory computer-readable storage media comprising a plurality of instructions that when executed cause one or more processors to perform a method, the plurality of instructions comprising:
instructions to receive, via a field of a first screen of a graphical user interface, a first specific position within a first existing module, at which additional software is to be executed, during execution of an existing generic version of application software that comprises a plurality of modules including the first existing module;
wherein the first specific position is selected, by user input in the first screen, to be at a beginning of the first existing module, or at an end of the first existing module, or at a specific line number in between the beginning and the end of the first existing module;
instructions to receive the additional software;
instructions to store in a database, a customization that comprises a first name of the first existing module, and the first specific position within the first existing module;
instructions to receive a new generic version of the application software;
instructions to receive automatically identify, in the new generic version of application software, by use of at least one processor and the customization in the database, a first new module having a first name identical to the first name of the first existing module in the existing generic version of the application software, the first existing module being associated with the additional software to be executed when executing an existing customized version of the application software;
instructions to receive via a second screen of the graphical user interface, a new specific position at which the additional software is to be executed in the first new module when executing a new customized version of the application software;
instructions to automatically prepare and store in one or more non-transitory computer-readable storage media, the new customized version of the application software to execute the additional software when executing the first new module in the new generic version of the application software;
wherein the new customized version of the application software is obtained, based on the new specific position, by automatic insertion of the additional software, directly or via a function call, into the new generic version of the application software; and
instructions to execute a new executable based on the new customized version of the application software.

10. The one or more non-transitory computer-readable storage media of claim 9 wherein:
an indication is received that the new specific position is unchanged; and
during execution of the new executable, the additional software is executed at the new specific position in the first new module.

11. The one or more non-transitory computer-readable storage media of claim 9 wherein the plurality of instructions to be executed to perform the method further comprise:
instructions to compile at least the existing customized version of the application software to obtain an existing executable and instructions to execute at least the existing executable, prior to receipt of the new generic version of application software.

12. The one or more non-transitory computer-readable storage media of claim 9 wherein:
L is the specific line number in the first existing module such that $$1<L<T$$

with T being a total number of lines of source code in the first existing module; and
the method further comprises receiving an indication of the specific line number L.

13. The one or more non-transitory computer-readable storage media of claim 9 wherein:
the first existing module comprises a plurality of first instructions in source code form;
the additional software comprises a plurality of second instructions in source code form;
a first customized module in the existing customized version of the application software comprises the plurality of first instructions and the plurality of second instructions;
the plurality of instructions to be executed to perform the method comprise instructions to prepare a third screen to display the first customized module; and
the plurality of instructions to be executed to perform the method comprise instructions to display in the third screen, the plurality of first instructions with line numbers and the plurality of second instructions without line numbers.

14. The one or more non-transitory computer-readable storage media of claim 9 wherein:

the new customized version of the application software is prepared by automatically inserting the additional software into the first existing module in the application software.

15. The one or more non-transitory computer-readable storage media of claim 9 further comprising:
   instructions to receive an indication via a re-apply button in the second screen that the new specific position is unchanged.

16. The one or more non-transitory computer-readable storage media of claim 15 wherein:
   the second screen displays multiple customizations including said customization;
   the specific position in each of the multiple customizations is at a module boundary;
   the module boundary is at the beginning or the end of a module; and
   the re-apply button is common to all the multiple customizations on the second screen.

17. The one or more non-transitory computer-readable storage media of claim 15 wherein:
   the second screen displays multiple customizations including said customization;
   said customization identifies the specific line number and the re-apply button is specific to said customization; and
   the second screen displays another re-apply button applicable to another customization among the multiple customizations.

18. An apparatus comprising one or more processors coupled to one or more non-transitory computer-readable storage media, wherein the one or more non-transitory computer-readable storage media comprise a plurality of instructions that when executed cause the one or more processors to perform a method, wherein:
   the one or more processors are configured by the plurality of instructions, to receive via a field of a first screen of a graphical user interface, a first specific position within a first existing module, at which additional software is to be executed, during execution of an existing generic version of application software that comprises a plurality of modules including the first existing module;
   wherein the first specific position is selected, by user input in the first screen, to be at a beginning of the first existing module, or at an end of the first existing module, or at a specific line number in between the beginning and the end of the first existing module;
   the one or more processors are configured by the plurality of instructions, to receive the additional software;
   the one or more processors are configured by the plurality of instructions, to store in a database, a customization that comprises a first name of the first existing module, and the first specific position within the first existing module;
   the one or more processors are configured by the plurality of instructions, to receive a new generic version of the application software;
   the one or more processors are configured by the plurality of instructions, to automatically identify, in the new generic version of application software, by use of at least one processor and the customization in the database, a first new module having a first name identical to the first name of the first existing module in the existing generic version of the application software, the first existing module being associated with the additional software to be executed when executing an existing customized version of the application software;
   the one or more processors are configured by the plurality of instructions, to receive via a second screen of the graphical user interface, a new specific position at which the additional software is to be executed in the first new module when executing a new customized version of the application software;
   the one or more processors are configured by the plurality of instructions, to automatically prepare and store in one or more non-transitory computer-readable storage media, the new customized version of the application software to execute the additional software when executing the first new module in the new generic version of the application software:
   wherein the new customized version of the application software is obtained, based on the new specific position, by automatic insertion of the additional software, directly or via a function call, into the new generic version of the application software; and
   the one or more processors are configured by the plurality of instructions, to execute a new executable based on the new customized version of the application software.

* * * * *